(12) United States Patent
Uribe et al.

(10) Patent No.: US 9,992,984 B2
(45) Date of Patent: Jun. 12, 2018

(54) FISHING REEL

(75) Inventors: Daniel Martin Uribe, Riverside, CA (US); James Joseph Abrams, Los Altos, CA (US)

(73) Assignee: Arribe Manufacturing, LLC, Saratoga, CA (US)

(*) Notice: Subject to any disclaimer, the term of this patent is extended or adjusted under 35 U.S.C. 154(b) by 997 days.

(21) Appl. No.: 13/984,837

(22) PCT Filed: Feb. 14, 2012

(86) PCT No.: PCT/US2012/025059
§ 371 (c)(1),
(2), (4) Date: Aug. 6, 2014

(87) PCT Pub. No.: WO2012/112560
PCT Pub. Date: Aug. 23, 2012

(65) Prior Publication Data
US 2014/0339350 A1  Nov. 20, 2014

Related U.S. Application Data

(60) Provisional application No. 61/442,685, filed on Feb. 14, 2011.

(51) Int. Cl.
*A01K 89/01* (2006.01)
*A01K 89/033* (2006.01)

(52) U.S. Cl.
CPC .................. *A01K 89/033* (2013.01)

(58) Field of Classification Search
CPC .. A01K 89/015; A01K 89/033; A01K 89/058; A01K 89/059
See application file for complete search history.

(56) References Cited

U.S. PATENT DOCUMENTS 1,363,817 A    12/1920  Schmid
2,335,752 A *  11/1943  Geiger ................ A01K 89/015
                                                    242/255

(Continued)

FOREIGN PATENT DOCUMENTS

WO    WO 2012/112560 A1    8/2012

OTHER PUBLICATIONS

International Search Report dated May 29, 2012, issued by the International Searching Authority in corresponding PCT Application Serial No. PCT/US2012/025059, filed Feb. 14, 2012.

(Continued)

*Primary Examiner* — Emmanuel M Marcelo
(74) *Attorney, Agent, or Firm* — Klarquist Sparkman, LLP

(57) ABSTRACT

A fishing reel can comprise a lever actuated drag mechanism within a reel housing with a lever projecting from the housing. A fine drag adjuster can be adjusted independently of the lever. The drag mechanism can include plural cams and cam engagers spaced about the periphery of a drag plate. An anti-rotation mechanism can have plural flexure members that engage teeth at the periphery of a dog wheel and at a location closer to the exterior of the reel housing than a spool supporting spindle. The spindle can be supported for axial movement to facilitate fine drag adjustment and can be restricted against rotational motion. A planetary or other handle operated drive mechanism can be used.

33 Claims, 21 Drawing Sheets

(56) References Cited

U.S. PATENT DOCUMENTS

| | | | | |
|---|---|---|---|---|
| 2,859,924 | A | * | 11/1958 | Sarah ................ A01K 89/015 192/48.5 |
| 3,499,609 | A | * | 3/1970 | Policansky .......... A01K 89/015 192/76 |
| 3,974,978 | A | | 8/1976 | Henze |
| 4,572,455 | A | | 2/1986 | Noda |
| 4,591,108 | A | | 5/1986 | Ban |
| 4,722,491 | A | | 2/1988 | Myojo |
| 4,775,113 | A | | 10/1988 | Emura et al. |
| 4,821,978 | A | | 4/1989 | Kaneko |
| 4,852,826 | A | * | 8/1989 | Sato .................... A01K 89/033 242/270 |
| 5,035,374 | A | * | 7/1991 | Kaneko ............... A01K 89/033 242/249 |
| 5,127,603 | A | | 7/1992 | Morimoto |
| 5,207,396 | A | | 5/1993 | Furomoto |
| 5,211,355 | A | | 5/1993 | Furomoto |
| 5,219,131 | A | * | 6/1993 | Furomoto ............. A01K 89/02 242/223 |
| 5,297,756 | A | * | 3/1994 | Ikuta ................... A01K 89/033 242/245 |
| 5,370,331 | A | | 12/1994 | Sato |
| 5,377,925 | A | | 1/1995 | Miyazaki |
| 5,386,948 | A | * | 2/1995 | Sato .................... A01K 89/015 242/313 |
| 5,547,141 | A | | 8/1996 | Yeh |
| 5,558,290 | A | | 9/1996 | Sato |
| 5,788,173 | A | | 8/1998 | Kawabe |
| 5,875,986 | A | | 3/1999 | Miyazaki et al. |
| 5,947,399 | A | | 9/1999 | Oh |
| 6,045,073 | A | * | 4/2000 | Ikuta ................... A01K 89/033 242/260 |
| 6,045,075 | A | | 4/2000 | Iwabuchi et al. |
| 6,047,913 | A | | 4/2000 | Yamaguchi et al. |
| 6,059,211 | A | | 5/2000 | Young |
| 6,189,822 | B1 | * | 2/2001 | Ikuta ................... A01K 89/033 242/257 |
| 6,293,484 | B1 | | 9/2001 | Oh |
| 6,412,720 | B1 | * | 7/2002 | Ikuta ................... A01K 89/015 242/269 |
| 6,460,793 | B1 | | 10/2002 | Hirayama |
| 6,502,775 | B1 | | 1/2003 | Neufeld |
| 6,805,313 | B2 | * | 10/2004 | Nilsen ................ A01K 89/015 242/245 |
| 6,959,887 | B2 | | 11/2005 | Kawasaki |
| 7,070,139 | B2 | | 7/2006 | Nakagawa et al. |
| 7,097,124 | B2 | | 8/2006 | Ikuta et al. |
| 7,104,484 | B2 | * | 9/2006 | Ikuta ................... A01K 89/033 242/303 |
| 7,108,214 | B2 | * | 9/2006 | Ikuta ................... A01K 89/033 242/246 |
| 7,175,120 | B2 | | 2/2007 | Ono |
| 7,198,219 | B1 | * | 4/2007 | Alajajyan .......... A01K 89/0117 242/247 |
| 7,429,011 | B1 | * | 9/2008 | Chang ................ A01K 89/033 242/245 |
| 2006/0006267 | A1 | | 1/2006 | Hirayama |
| 2008/0173745 | A1 | * | 7/2008 | Takechi ............... A01K 89/015 242/321 |
| 2009/0179100 | A1 | | 7/2009 | Crofoot |
| 2010/0006688 | A1 | * | 1/2010 | Ikuta ................... A01K 89/033 242/297 |

OTHER PUBLICATIONS

Written Opinion dated May 29, 2012, issued by the International Searching Authority in corresponding PCT Application Serial No. PCT/US2012/025059, filed Feb. 14, 2012.

* cited by examiner

FISHING REEL

CROSS REFERENCE TO RELATED APPLICATION

This is the U.S. National Stage of International Application No. PCT/US2012/025059, entitled FISHING REEL, filed on Feb. 14, 2012, which was published in English under PCT Article 21(2), which in turn claims the benefit of U.S. Provisional Application Ser. No. 61/442,685, entitled FISHING REEL, filed on Feb. 14, 2011. The provisional application is incorporated herein in its entirety.

TECHNICAL FIELD

This disclosure relates to fishing reels, components thereof and related methods.

BACKGROUND

Fishing is an extremely popular sport. Commonly, fishing reels are used in combination with fishing rods in fishing with the reels playing out and retrieving line with a baited hook, lure or other fish catching device attached to the line. Conventional fishing reels have a spool that is rotated by a handle operated drive mechanism to retrieve the line. To allow line to play out from the spool, for example when a fisherman is playing a fish, a drag mechanism allows the spool to turn and play out line when a drag force applied to the spool by the drag mechanism is overcome. A typical drag mechanism can be adjusted to a free spool position in which little or no drag is supplied to the spool so that the spool can freely spin, such as when a user is casting.

Although many types of reels are known, there is nevertheless a need for improvements to fishing reels.

SUMMARY

For purposes of this description, certain aspects, advantages, and novel features of embodiments of this disclosure are described herein. The disclosed apparatuses, systems, and methods should not be construed as limiting in any way. Instead, the present disclosure is directed toward all novel and nonobvious features and aspects of the various disclosed embodiments, alone and in various combinations and subcombinations with one another. The disclosed embodiments are not limited to any specific aspect or feature or combination thereof, nor do the disclosed embodiments require that any one or more specific advantages be present or problems be solved.

In accordance with one aspect of an embodiment, a fishing reel drag system comprises a lever actuated drag adjustment assembly operable to apply a drag force to an end portion of a spool of a fishing reel. In addition, in accordance with another aspect of an embodiment, a fine drag adjustment mechanism is operable to apply a drag force to the spool independently of the drag force applied by the lever actuated adjustment mechanism.

In accordance with an aspect of an embodiment, the fine drag adjustment mechanism axially shifts the position of a spool supported spindle to move the spool to change the drag adjustment force on the spool. In addition, a lever actuated drag adjustment mechanism comprises a cam that cooperates with the drag adjustment lever to move a brake member axially toward and away from the spool to adjust the drag on the spool.

In accordance with an aspect of an embodiment, a handle actuated drive is coupled by the drag assembly to the spool such that rotation of the handle drives the spool when the drag forces applied to the spool exceed resisting forces, such as arising from a fish pulling on the line. In one desirable form, the spindle is decoupled from the drive mechanism so that forces applied by the drive mechanism do not rotate the spindle. This approach facilitates the independent adjustment of the fine drag mechanism regardless of the position of the drag lever actuated drag assembly.

In accordance with another aspect of an embodiment, an anti-rotation mechanism can be provided to restrict the rotation of a handle drive mechanism against rotation in a direction that would play out line from the spool. The anti-rotation mechanism can comprise a dog wheel with teeth positioned closer to the exterior of the housing than to the spindle, such as the teeth being adjacent to an interior wall of a chamber portion of the housing. The dog mechanism is desirably decoupled from the spindle so that it can rotate without rotating the spindle while being rotated by a handle actuated drive mechanism. Dogs, such as flexure members coupled to the housing, are positioned to engage teeth of the dog wheel at the periphery of the dog wheel to block rotation of the drive mechanism, and thus the handle, in the direction opposite to the direction that results in line being taken up on the spool.

As a further aspect of an embodiment, the reel drive mechanism can comprise a planetary gear drive mechanism that results in efficient transfer of drive forces to the spool. In addition, the use of a planetary gear drive mechanism can result in higher drive ratios such that fewer turns of the handle are required to move the spool and take up a quantity of line.

In accordance with an embodiment, a fishing reel can comprise: a housing; an elongated spindle coupled to the housing; a fishing line spool comprising first and second spool end portions and a spool body portion, the spool defining a spindle receiving opening extending axially through the spool, the spool being rotatably coupled to the spindle with the spindle positioned in the spindle receiving opening such that the spool is rotatable relative to the spindle; a brake member rotatably supported by the spindle for rotation relative to the spindle, the brake member comprising a braking surface positioned to face one of the first and second spool end portions, said one of the first and second spool end portions comprising a brake member actuation surface opposed to the braking surface, at least one brake disc positioned at least partially between the braking surface and the brake actuation surface; a drag adjustment member rotatably coupled to the spindle and axially movable relative to the spindle axis, the drag adjustment member also being rotatable relative to the brake member, the drag adjustment member comprising opposed first and second drag adjustment surfaces, the first drag adjustment surface facing the brake member actuation surface; a cam member coupled to the housing in a fixed position relative to the housing, the cam member comprising a first cam member surface facing the second drag adjustment surface, one of the first cam member surface and the second drag member surface comprising a cam coupled thereto and the other of the first cam member surface and second drag member comprising at least one cam engager positioned to engage the cam, the cam being configured such that rotation of the drag adjustment member about the spindle and relative to the cam member in a first direction of rotation results in the cam and cam engager moving the drag adjustment member axially toward the spool and rotation of the drag adjustment member about the spindle and relative to the cam member in a second direction of rotation opposite to said first direction or rotation results in the cam and cam engager moving the drag adjustment member axially away from the spool, and wherein the movement of the drag adjustment member toward the spool increases the force of the brake disc on the spool and increases the drag on the spool and movement of the drag adjustment member away from the spool reduces the force of the brake disc on the spool and decreases the drag on the spool; a first biasing member positioned to bias the spool away from the brake member; the drag adjustment member comprising a drag adjustment member position adjustment projection extending outwardly from the housing; a fine drag adjuster rotatably coupled to the housing for rotation about the spindle axis, the fine drag adjuster being coupled to the spindle such that rotation of the fine drag adjuster in a first direction of fine adjuster rotation shifts the spindle and spool axially relative to the housing in a first direction of spool motion and moves the brake member actuation surface of the spool toward the first drag adjustment surface of the drag adjustment member to increase the force of the brake disc on the spool and increase the drag on the spool, and such that rotation of the fine drag adjuster in a second direction of fine adjuster rotation that is opposite to said first direction of fine adjuster rotation allows the first biasing member to shift the spindle and spool axially relative to the housing in a second direction of spool motion opposite to the first direction of spool motion to move the brake member actuation surface of the spool away from the first drag adjustment surface of the drag adjustment member so as to decrease the force of the brake disc on the spool and decrease the drag on the spool; and a handle rotatably coupled to the housing and drivenly coupled to the spool by the drag applied to the spool by the cam member, drag adjustment member and brake such that rotation of the handle in one direction of handle rotation rotates the spool in one spool rotation direction about the spindle to take up fishing line onto the spool.

In accordance with another aspect of an embodiment, the cam can comprise at least one cam element projecting outwardly from said one of the first cam member surface and the second drag member surface toward the other of the first cam member surface and second drag member surface. The cam element can comprise a plurality of cam segments that each project outwardly a different distance with a first cam segment projecting outwardly a first distance, a second cam segment projecting outwardly a second distance and a third cam segment projecting outwardly a third distance, wherein the first distance is less than the second distance, and wherein the second distance is less than the third distance. Also, at least one cam engager can comprise a projection having a distal end portion configured to abut the cam segments. In this embodiment, rotation of the drag adjustment member in the first direction of rotation moves the distal end portion in a direction from the first toward the third cam segments to increase the drag. In addition, rotation of the drag adjustment member in the second direction of rotation moves the distal end portion in a direction from the third toward the first of the cam segments to thereby decrease the drag. Also, engagement of the distal end portion with the first cam segment results in a first drag setting corresponding to a first drag on the spool, engagement of the distal end portion with the second cam segment results a second drag setting corresponding to a second drag on the spool that is greater than the first drag on the spool, and engagement of the distal end portion with the third cam segment results in a third drag setting corresponding to a third drag on the spool that is greater than the second drag on the spool. The first drag setting can correspond to a minimum free spooling drag setting.

As another aspect of an embodiment, each of the cam segments can comprise a recess configured to receive the distal end portion of the cam engager upon moving the distal end portion into a position in alignment with the recess. As a result, the distal end portion is positively engaged with the segment while permitted to move out of the recess upon rotation of the drag adjustment member.

As another aspect of an embodiment, the cam engager can comprise a first ramp positioned between the first cam segment and the second cam segment and a second ramp positioned between the second cam segment and the third cam segment. In accordance with this aspect, the distal end portion of the cam slides along the respective first ramp when moved between the first and second cam segments and slides along the second ramp when moved between the second and third cam segments.

As a further aspect of an embodiment, a plurality of said cam elements and a plurality of cam engagers can be provided in a fishing reel with each cam engager being associated with and positioned to engage a respective associated one of the cam elements. In addition, the cams and cam engagers can be positioned such that each cam engager is simultaneously engaged with the first cam segment of the associated cam when the drag adjustment member is rotated to at least one position of adjustment, is simultaneously engaged with the second cam segment of the associated cam when the drag adjustment member is rotated to at least one second position of adjustment, and is simultaneously engaged with the third cam segment of the associated cam when the drag adjustment member is rotated to at least a third position of adjustment.

As a more specific aspect of an embodiment, there can be four of said cam elements and cam engagers, the cams being mounted to or comprising a portion of the cam member, the cam member comprising an annular cam member supporting the cams at or adjacent to the periphery of the cam member, the cam elements comprising arcuate cam elements, the cams being equally spaced about the periphery of the annular cam member.

As yet another aspect of an embodiment, the cam can comprise plural spaced apart cam elements projecting outwardly from one of a first cam member surface and a second drag member surface toward the other of the first cam member surface and second drag member surface. The cam elements can also each comprise a cam surface with cam surface portions that project outwardly differing distances. Also, plural cam engagers can be provided with each cam engager being associated with and positioned to engage the cam surface of a respective one of the cam elements. The cam elements can each comprise an arcuate cam surface, the cam surface comprising a plurality of spaced apart recesses positioned for engagement by the associated cam engager. In addition, a cam member can comprise an annular cam member with an outer periphery. The cam elements can be coupled to the cam member at or adjacent to the outer periphery of the cam member.

As yet another aspect of an embodiment, the fishing reel can comprise a handle anti-rotation assembly coupled to the handle and operable to restrict the rotation of the handle in a direction opposite to said one direction of handle rotation that results in line being taken up onto the spool. The anti-rotation assembly can comprise a dog wheel comprising a periphery that comprises dog teeth spaced about the periphery of the dog wheel. The dog wheel can be supported within the housing so as to rotate relative to a spool supporting spindle. In addition, a plurality of spaced apart dog elements can be coupled to the housing and configured to engage the dog teeth, the dog elements and dog teeth being shaped to allow rotation of the handle in the one direction of handle rotation and to restrict the rotation of the handle in a direction of handle rotation opposite to said one direction of handle rotation. The dog wheel can be sized such that the periphery of at least a portion of the dog wheel is spaced closer to the exterior of the housing than to the spindle. As a further aspect of an embodiment, the dog elements can each comprise a flexure element comprising first and second leg portions coupled together at a proximate end portion and spaced apart at a distal end portion. The distal end portion of the first leg portion can be coupled to the housing. The flexure members can be oriented such that the distal end portion of the second leg portion repetitively engages and disengages the teeth as the handle is rotated in said one direction of handle rotation. In addition, the flexure member can bias the distal end portion of the second leg portion into engagement with the teeth.

In accordance with yet another aspect of an embodiment, a fishing reel can comprise a support comprising a first end portion, an intermediate portion and a second end portion, the support defining a spindle receiving passageway extending axially through the support, the support being rotatable relative to the spindle, the first end portion being drivenly coupled to a handle such that the support is rotated in response to rotation of the handle in one direction of handle rotation that results in line being taken up on a spool. Also, the brake member can comprise a brake collar portion carried by the second end portion of the support and axially slidable relative to the support. The drag adjustment member can be rotatably carried by the brake collar portion. As a further aspect of this embodiment, a dog wheel can be carried by the support and rotatable with the rotation of the support. The dog wheel can comprise a periphery that comprises dog teeth spaced about the periphery of the dog wheel. The dog wheel can be supported within the housing so as to rotate relative to the spindle. A plurality of spaced apart dog elements can be coupled to the housing and configured to engage the dog teeth with the dog elements and dog teeth being shaped to allow rotation of the handle in the one direction of handle rotation and to restrict the rotation of the handle in a direction of handle rotation opposite to said one direction of handle rotation.

As still further aspects of an embodiment, the housing can comprise first and second housing end portions with a spool receiving chamber defined therebetween. A spindle can comprise first and second end portions. A first housing end portion can define a first adjuster receiving recess having a base and a side wall. The first end portion of the spindle can extend through the fine adjuster receiving recess. The second housing end portion can be coupled to the second end portion of the spindle. A fine drag adjuster can comprise a fine adjustment knob threaded onto the first end portion of the spindle and positioned partially in the adjuster receiving recess. The knob can be rotatable relative to the spindle and supported such that rotation of the knob in the first direction of fine adjuster rotation shifts the spindle and spool axially relative to the housing in a first direction of spool motion. This knob motion moves the brake member actuation surface of the spool toward the first drag adjustment surface of the drag adjustment member and increases the force of the brake disc on the spool and increases the drag on the spool. Rotation of the knob in a second direction of fine adjuster rotation opposite to the first direction allows a biasing member to shift the spindle and spool axially relative to the housing in a second direction of spool motion opposite to the first direction of spool motion. This action moves the brake member actuation surface of the spool away from the first drag adjustment surface of the drag adjustment member so as to decrease the force of the brake disc on the spool and decrease the drag on the spool. The fine drag adjuster can also comprise a biasing member positioned in the recess between the knob and base of the recess operable to bias the knob away from the base of the recess. This latter biasing member can comprise a stack of plural belleville washers.

As a further aspect of an embodiment, a planetary gear drive assembly can be operatively driven by rotation of the handle and coupled to the spool by the drag on the spool from the drag adjustment member, cam member and brake member to rotate the spool. The planetary gear drive assembly can comprise a drive gear rotated about a drive gear axis in response to rotation of the handle in said one direction of handle rotation, a planet carrier gear supported by the spindle for rotation about a second axis offset from the drive gear axis, the planet carrier gear being driven in rotation in response to rotation of the drive gear, a planet gear carrier rotated about the second axis in response to rotation of the planet carrier gear, a plurality of planet gears (such as four planet gears) pivotally carried by the planet gear carrier, a ring gear coupled to the housing and engaged by the planet carrier gears, a sun gear coupled to the spool by the drag on the spool from the drag adjustment member, cam member and brake member to rotate the spool in said one spool rotation direction upon driving the sun gear, the planet gears driving the sun gear to rotate the spool via the drag on the spool upon rotation of the drive gear. In accordance with one embodiment, the ring gear can be fixed to the housing. In accordance with an alternative embodiment, the ring gear can be rotatable and the planetary gears retained in a fixed position on a carrier.

In accordance with a further aspect of an embodiment, a fishing reel can comprise: a housing; an elongated spindle coupled to the housing; a fishing line spool comprising first and second spool end portions and a spool body portion, the spool defining a spindle receiving opening extending axially through the spool, the spool being rotatably coupled to the spindle with the spindle positioned in the spindle receiving opening such that the spool is rotatable relative to the spindle; a brake member supported by the spindle and movable axially toward and away from a first end portion of the spool; a lever actuated drag assembly operable to shift the brake member axially in a first direction toward the spool to increase the drag force on the spool and to shift the brake member axially in a second direction opposite to the first direction away from the spool to decrease the drag force on the spool; a handle drivenly coupled to the spool through the drag assembly to rotate the spool upon rotation of the handle; and a fine drag adjuster coupled to the spindle and operable to shift the spool relative to the spindle in the second direction toward the brake member to increase the drag force on the spool and to shift the spool in the first direction away from the brake member to decrease the drag force. In addition, the fine drag adjuster can be operable to shift the spool regardless of the drag force applied to the spool by the lever actuated drag assembly.

Fishing reel methods of component interaction are also within the scope of this disclosure.

The foregoing and other objects, features, and advantages of embodiments disclosed herein will become more apparent from the following detailed description, which proceeds with reference to the accompanying figures.

DETAILED DESCRIPTION

Figure 1:
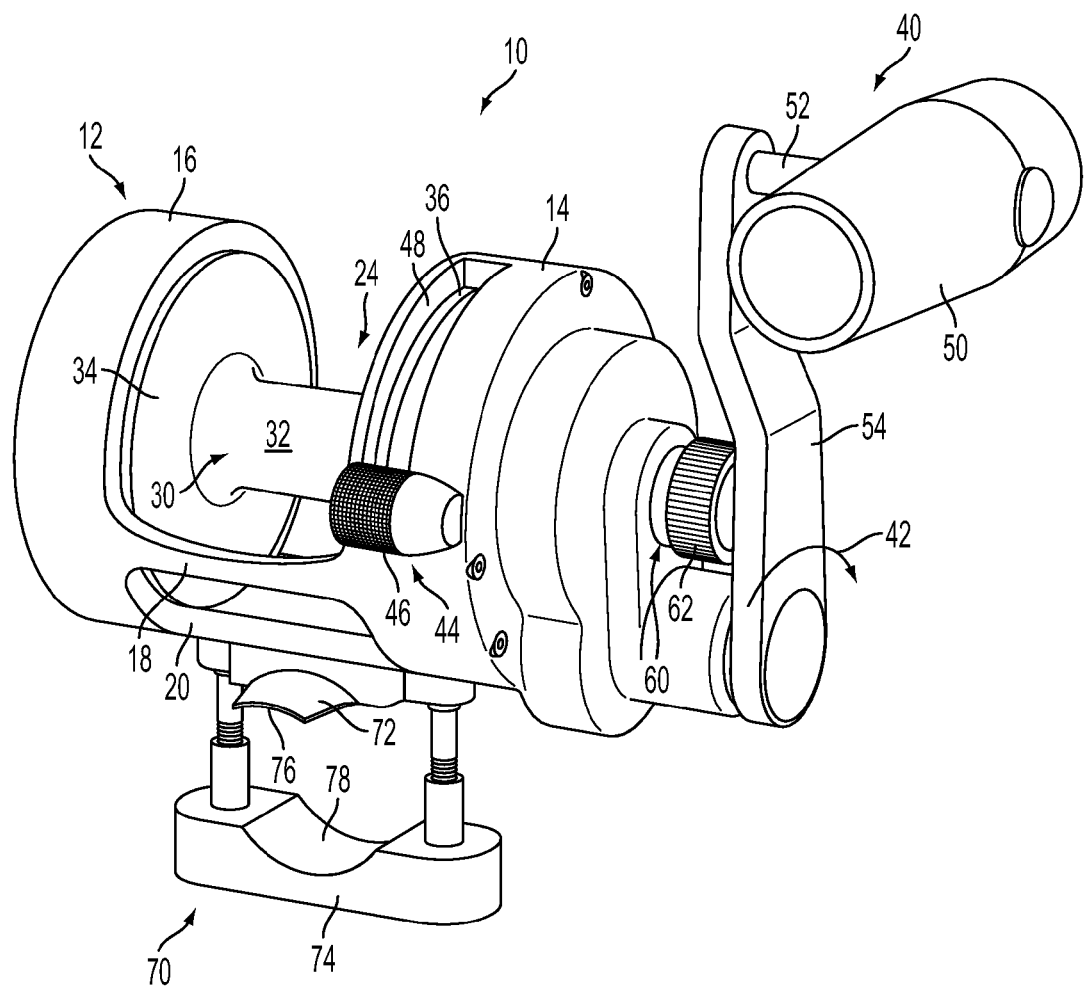
FIG. 1 is a perspective view of a fishing reel in accordance with one embodiment. The fishing reel of FIG. 1 is a right handed level wind reel meaning that when mounted in a normal position on a rod with the reel facing upwardly, the handle is positioned for turning by the right hand of a fisherman, it being understood that the components of the fishing reel can be rearranged for left handed operation with the handle at the opposite end of the reel.
Figure 2:
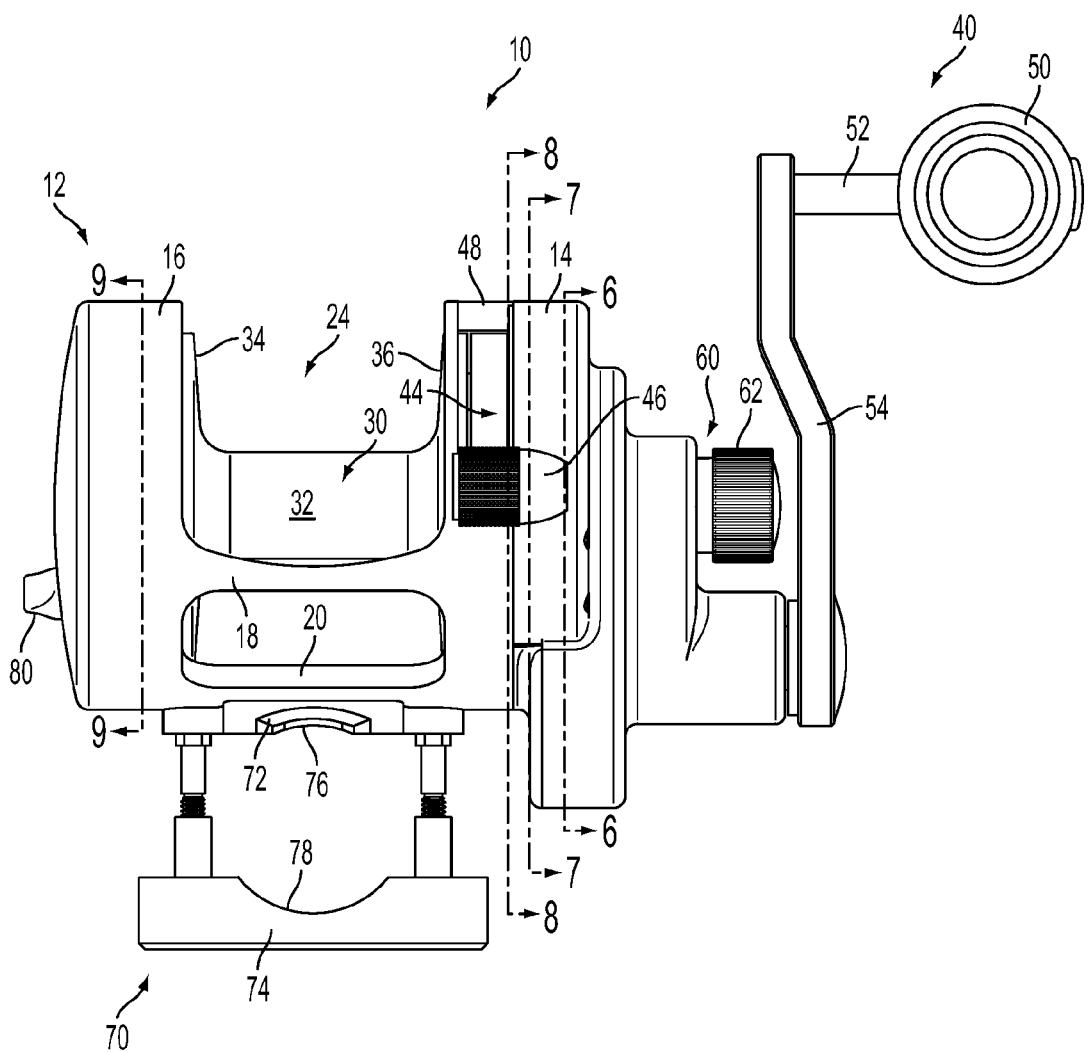
FIG. 2 is a side elevation view of the fishing reel of FIG. 1.
Figure 3:
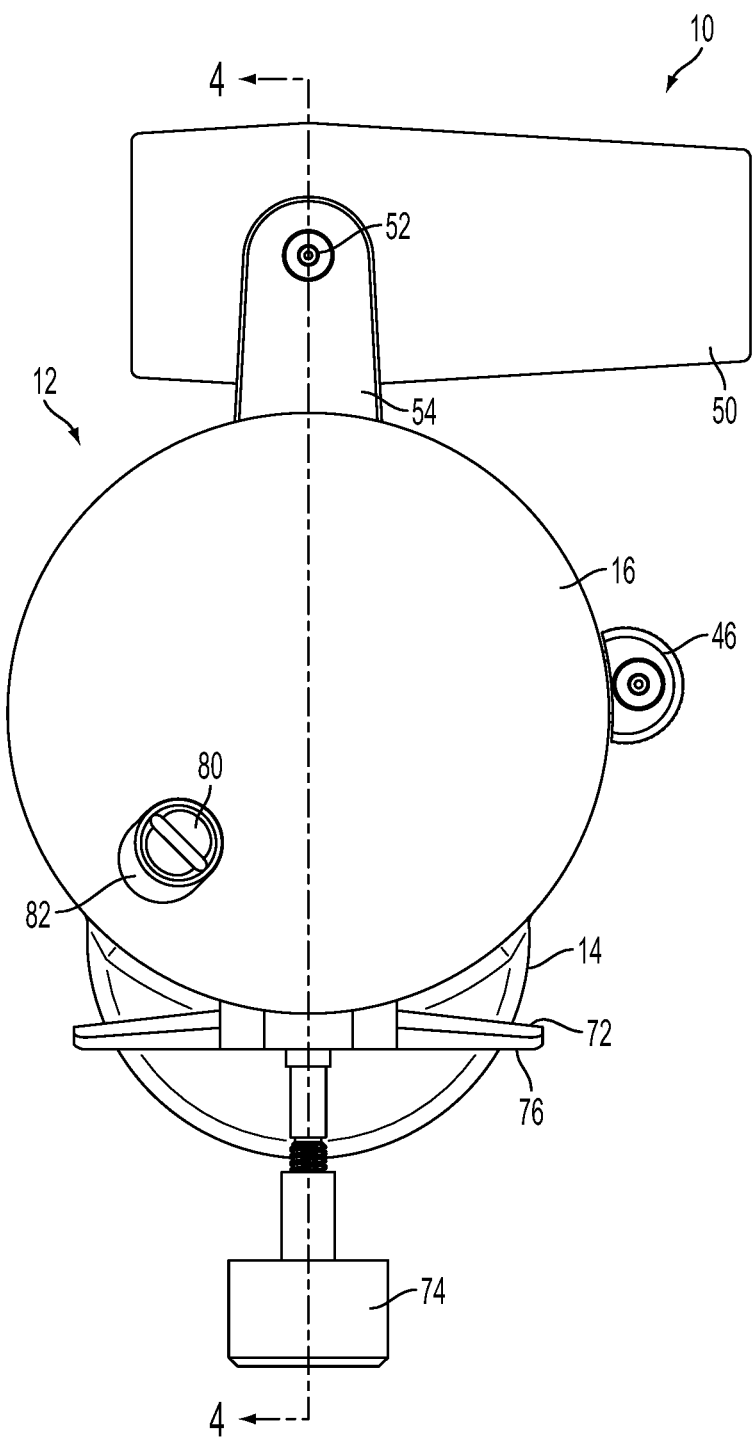
FIG. 3 is an end view of the fishing reel of FIG. 1, looking from the left hand side of FIG. 1.

With reference to FIGS. 1, 2 and 3, a fishing reel 10 in accordance with a first embodiment is shown. Reel 10 comprises a level wind reel having a housing 12. The illustrated housing comprises first and second housing end portions 14, 16 with bridging or cross portions 18, 20 interconnecting the end portions. The housing end portions 14, 16 are spaced apart from one another so as to provide a spool receiving gap 24 or chamber therebetween.

A fishing line spool 30 coupled to the housing comprises a body 32 and first and second spaced apart end portions 34, 36 (see FIG. 2). The spool is carried by a spindle as explained below and is rotatable relative to the housing. A handle 40 is rotatable in a first handle direction of rotation, such as clockwise as shown by arrow 42 in FIG. 1, to drive a drive mechanism within the housing. In the embodiments described below, the drive mechanism is positioned within housing end portion 14. The drive mechanism is coupled through a drag assembly to the spool to apply a driving force to the spool. Whenever the drag force applied by the drag assembly to the spool exceeds the resistance being applied to the spool by, for example, a fish on the end of the line, rotation of the handle 40 in the direction of arrow 42 takes up line onto the spool 32.

In one desirable form, the drag assembly comprises a lever actuated drag assembly. In this assembly, a lever 44, that can comprise a knurled or other textured knob 46 at the end of the lever, projects outwardly from the housing through a slot 48 in the housing. The slot 48 can be arcuate and extend along a portion of the periphery of housing section 14, such as through about 60 to 90 degrees. As will be apparent from the description below, shifting the position of the lever 44 within the slot 48 adjusts the position of a drag adjustment member and a brake member to adjust the drag on the reel spool.

The illustrated handle 40 comprises a knob 50 pivoted by a pivot structure 52 to a handle arm 54. The handle arm 54 engages a drive shaft comprising a portion of the spool driving mechanism as explained below.

Desirably the fishing reel also comprises a fine drag adjustment mechanism, a portion of which is indicated at 60 in FIG. 1. The illustrated fine drag adjustment mechanism can comprise a projecting knob 62, that can be knurled or otherwise textured. Rotation of the knob in one direction results in increasing the drag on the reel spool. In contrast, rotation of the knob in the opposite direction reduces the drag on the spool. Desirably the drag adjustment mechanism 44 and the fine drag adjustment mechanism 60 are independently operable.

The fishing reel illustrated in FIG. 1 also comprises a rod mounting or seating structure, such as shown at 70. The illustrated structure 70 comprises a clamp that comprises an upper clamp portion 72 and a lower clamp portion 74. Clamp element 72 has a downwardly facing elongated arcuate concave surface 76. In addition, clamp element 74 has an upwardly facing elongated arcuate concave surface 78. Clamp element 74 can be moved toward or away from clamp element 72 such that a fishing rod seat can be positioned between these components with these components then being drawn together to clamp the reel to the fishing rod. Alternatively, clamp element component 72 can be placed in a reel seat of the rod, without the component 74 and interconnecting posts. In this case, a reel to rod seat mechanism on the rod clamps the reel in place.

The reel can comprise a click mechanism, which can be conventional, for providing a clicking sound to a user of the reel when the click mechanism is activated. With reference to FIG. 3, a click actuator, such as a button 80 (see also FIG. 2), projects outwardly through a slot 82 in housing end section 16. The button 80 can be slid radially (relative to the center of the reel spool) outwardly and inwardly along slot 82. The button is shown in its radially inward most and activated position in FIG. 3. As explained below, when in its activated position, a clicker is engaged so that a clicking sound is produced as the reel spool turns.

Features of an exemplary embodiment of the reel of FIG. 1 will become apparent with reference to FIGS. 4-21. More specifically, with reference to FIGS. 4 and 5, the illustrated spool 30 defines an axially extending spindle receiving opening 100 that passes through the end portions 34, 36 and body portion 32 of the spool. An elongated spindle 102, that is elongated in the axial direction, or the direction about which the spool rotates, is positioned within the spindle receiving opening with end portions of the spindle being coupled to the respective housing end sections or portions 14, 16. In this example, the spool is carried by the spindle and more specifically is rotatably coupled to the spindle with the spindle positioned in the spindle receiving opening 100. Bearings 104, 106 can be positioned within respective bearing receiving recesses 108, 110 defined by the spool and support the spool 30 for rotation relative to the spindle.

Figure 4:
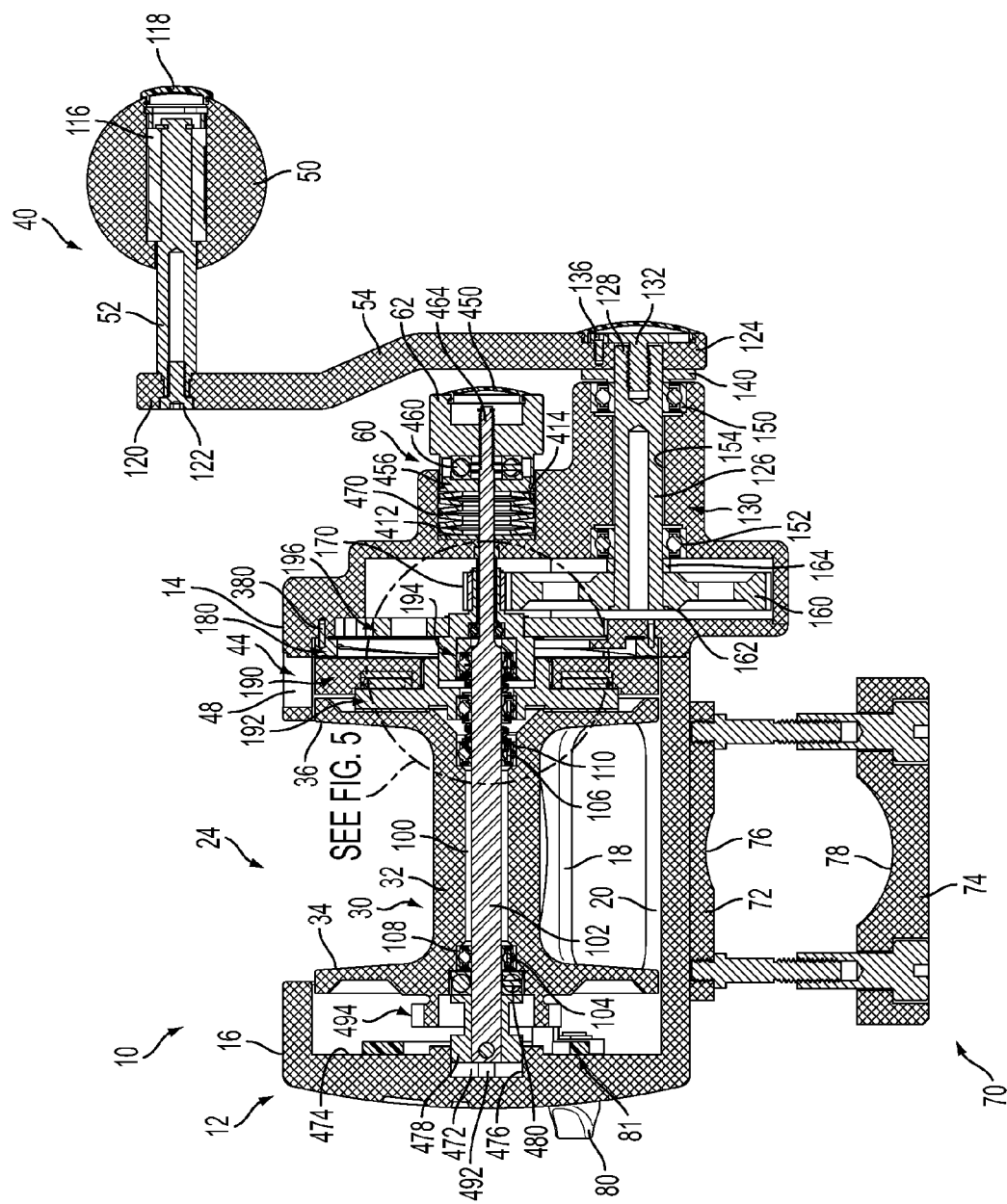
FIG. 4 is a vertical sectional view of the fishing reel of FIG. 3, taken along line 4-4 of FIG. 3.

In the construction shown in FIG. 4, the handle 50 is mounted to a handle shaft 52 that is coupled to the handle arm 54. Handle 50 is pivoted to shaft 52 by a bushing 116 with the bushing and handle being retained on the shaft, such as by a snap ring. An end cap 118, such as of a flexible material with rubber being an example, can snap-fit into the end of the handle 50. The shaft 52 is secured to the distal end portion 120 of the handle, such as by a retaining screw 122. The end portion 124 of handle 54 is coupled to a drive shaft 126. In the illustrated example, a distal end 128 of the drive shaft projects outwardly from a portion 130 of the housing. The handle end portion 124 is mounted to end portion 128 of shaft 126 in this example by a threaded screw 132. The handle 54 can be keyed to, mated to, or otherwise secured to the shaft to prevent rotation of the handle relative to the shaft. In the embodiment of FIG. 4, a screw 136 with a hexagon head is threaded into the arm 54 adjacent to the head of screw 132. The heads of the respective screws 132, 134 abut one another to restrict rotation of handle 54 relative to the shaft 126. A spacer 140 is positioned between an inner surface of arm portion 124 and the outer surface of the adjacent housing portion.

The shaft 126 is supported for rotation relative to housing section 130, such as by respective bearings 150, 152 seated within recesses defined within housing portion 130. The housing portion 130 also defines a shaft receiving opening 154 extending in an axial direction through which the shaft 126 extends. A drive gear 160 is keyed to or otherwise drivenly connected to the shaft 126 so that rotation of the handle 40 rotates the drive gear. The drive gear 160 is held in axial position on shaft 126, such as by an annular lip 162 at the end of the shaft and a spacer 164 positioned between an inward side of drive gear 160 and an inner race of the bearing 152.

The drive gear 160 of this example engages a pinion gear 170 with the pinion gear 170 being driven in response to rotation of the handle and drive gear. In this illustrated embodiment, the pinion gear 170 is rotatable relative to the spindle so that the pinion gear does not drive the spindle in rotation. Rotation of the pinion gear drives the rotation of the spool through the drag mechanism 44 as explained below. It should be noted that, in alternative constructions, the pinion gear or other drive mechanism can rotate the spindle with the spool being rotatable with the spindle. Alternative forms of drive mechanisms can be used, such as a planetary gear drive mechanism described below.

Rotational forces resulting from rotation of drive gear 170 are transferred via a drag assembly to the spool to rotate the spool if the drag forces are not exceeded by forces resisting such motion. The illustrated drag assembly comprises a cam, cam engager, drag member such as a drag plate, and a brake. In one desirable form, the cam engager is mounted to, or comprises a portion of, the drag member and the cam comprises a portion of, or is mounted to, the housing. These components can alternatively be reversed with the cam being mounted to or comprising a portion of the drag adjustment member and the cam engager being coupled to the housing. The term "coupled to" in this disclosure includes being formed as a unitary part of. With reference to FIG. 4, an exemplary cam member is indicated at 180, an exemplary drag adjustment member is indicated at 190 and an exemplary brake member is indicated at 192. These components are carried by a support 194 that is driven in rotation by the gear 170 in this example. An anti-rotation mechanism, in this example comprising a dog ring or dog wheel 196 is also carried by the support 194. Dog ring 196 is mounted to the support for rotation with the support as gear 170 is driven. Example of these mechanisms are explained below.

Figure 5:
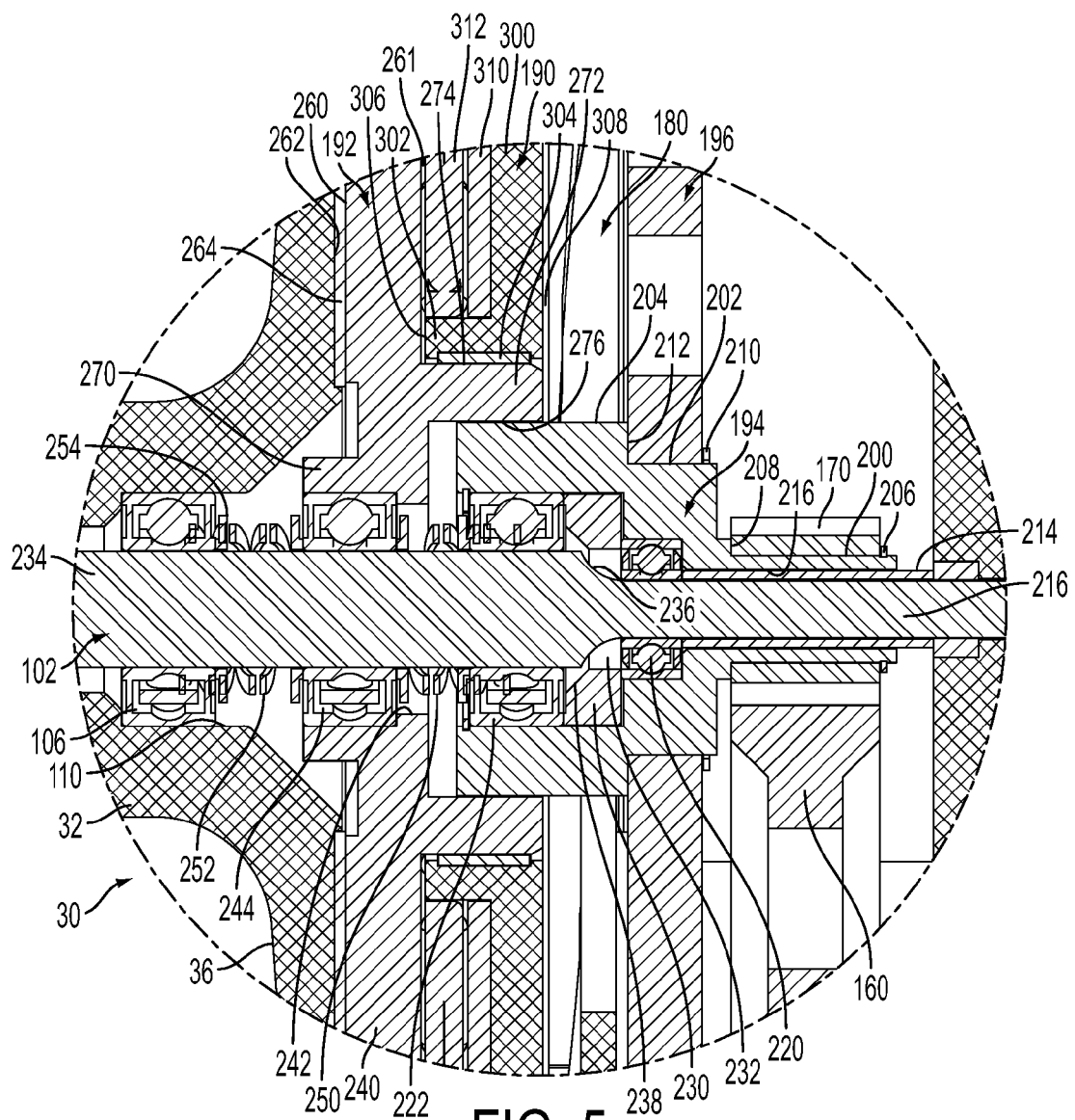
FIG. 5 is an enlarged view of a portion of the fishing reel of FIG. 4.

With reference to FIG. 5, the illustrated support 194 can comprise a plural tiered collar. In this example, the support 194 comprises a first collar section 200 nearest to handle 54, a second intermediate collar section 202, and a third end collar section 204 spaced from the first collar section by the intermediate collar section. Collar section 200 can be sized to receive the gear 170 thereon with the gear being retained by, for example, a snap ring 206. An annular end wall 208 of collar section 200 engages the side of gear 170 opposite to snap ring 206 so that the gear is held in place. A dog wheel 96 is keyed to, mated to, or otherwise coupled to the section 202 such that the dog wheel rotates with the rotation of the coupler 194. A snap ring 210 or other retainer retains dog wheel 196 on the collar portion 202. An end wall 212 of the collar portion 202 provides a stop that is positioned to engage an interior side wall of the dog wheel with the dog wheel being positioned between snap ring 210 and the stop 212. A bushing 214 is positioned between the exterior surface of a section 216 of the spindle having a reduced diameter and the interior surface of a passageway 216 extending through the collar. In this example, bearings 220, 222, seated respectively in a recess in collar section 202 and a recess in collar section 204, rotatably couple the collar to the spindle.

A spacer 230 can be positioned between bearings 222 and 220. A first side wall of the exemplary spacer engages the outer race of bearing 220 and the opposed side wall of spacer 230 engages a side of bearing 222. Spacer 230 defines a spindle receiving opening 232 therethrough. A portion of the opening 232 adjacent to bearing 220 has an annular wall with a diameter or cross-sectional dimension that is sized to allow a portion of a section 234 of the spindle 102 to slide axially into and out of the opening 232. Spindle section 232 in this example has a diameter that is greater than the diameter of spindle section 216. An annular necked-down or tapered transition region 236 is provided between spindle sections 216, 234. An enlarged entrance portion 238 of passageway 232 is positioned at the location where the spindle enters the passageway or opening 232. The entrance portion 238 has a cross-sectional area that is greater than the cross-sectional dimension of shaft section 234 at its entrance and transitions to a cross-sectional area corresponding to the cross-sectional area of shaft section 234. The section 238 of opening 232 can be frusto-conical in shape. The tapering surfaces of the entrance opening can assist in guiding the spindle 102 axially into the narrowed portion of the opening 232.

The brake member 192 comprises, in this example, a brake body 240 that is desirably annular with a central opening 242 through which the spindle passes. The brake member 192 is supported by the spindle for rotation relative to the spindle. In this example, a bearing 244 rotatably couples the brake member to the spindle. A biasing member, such as a spring 250 is positioned between bearing 222 and bearing 244 and another biasing member 252 is positioned between bearing 244 and bearing 106. These biasing members can comprise springs. A respective spacer can be positioned between each end of the spring and the adjacent bearing. One such spacer is indicated at 254 in FIG. 5.

The brake member can comprise a first surface 260, that can comprise a disc brake surface, facing an adjacent surface 262 of the spool end portion 36. One or more brake pads, such as a brake disc pad 264, can be positioned between the surfaces 260, 262. The brake pads can, for example, comprise plural brake disc pads with one such disc being adhesively secured or otherwise mounted to surface 262 and the other such disc being adhesively secured or otherwise mounted to the surface 260. For example, ceramic brake disc pads can be used, although any suitable brake disc pad material can be selected. Another exemplary brake disc material is comprised of carbon fibers held together by a binder. Alternatively, a single brake disc can be used and positioned, for example, loosely positioned, between these surfaces.

The illustrated brake member 192 comprises a first collar portion 270 extending axially away from the surface 260 and toward the spool. The interior of collar portion 270 comprises a seat for the bearing 244. In addition, the brake member 192 comprises a second collar portion 272 extending axially away from the body 240 of the brake member and away from the spool 30. The brake member 274 is desirably coupled to support 194 so as to be shiftable axially toward and away from the handle. In the illustrated embodiment, the interior surface 276 of collar 272 is slidably coupled to the support portion 204 to permit this axial movement. In addition, the collar 274 is coupled to support section 204 so as to rotate with the rotation of section 204. That is, relative rotation of brake member 192 and support 204 is desirably prevented in this embodiment. The interior surface 276 of collar portion 272 can have a non-round surface that mates with a correspondingly shaped surface of the exterior of support section 204 to prevent relative rotation of these components while permitting relative axial sliding motion.

The drag adjustment member 190 in the illustrated embodiment can comprise a body 300 that is desirably annular with a brake coupling portion 302 comprising an interior collar that is rotatably coupled to the collar 272 of the brake member, such as by a bearing 304. As a result, the brake member can rotate relative to the drag adjustment member and the drag adjustment member can be rotated relative to the brake member. The drag adjustment member can comprise a first surface 306 facing the adjacent surface 261 of the brake member body and a second surface 308 facing the cam member 180. Surface 306 desirably defines a recess for receiving a spacer 310 and a bearing 312, such as a needle thrust bearing, with needle bearings facing and engaged with the surface 261. The above described elements will become more apparent with reference to FIGS. 6-21.

Figure 6:
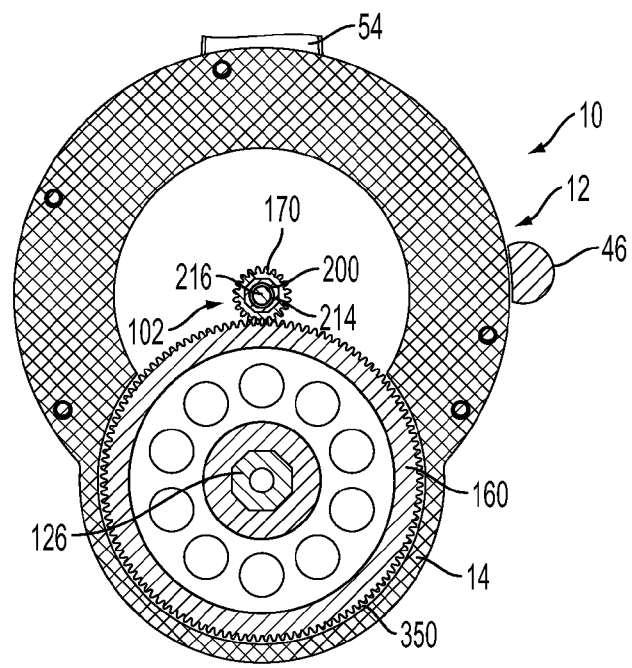
FIG. 6 is a vertical sectional view of the fishing reel of FIG. 2, taken along line 6-6 of FIG. 2.

In FIG. 6, taken along line 6-6 of FIG. 2, a portion of the housing section 14 is shown with a gear accommodating pocket 350 providing space for the gear 160 coupled to drive shaft 126. The coupling of pinion gear 170 to drive gear 160 is also shown in this figure. In addition, the mounting of gear 170 to collar 200 of the support 194 (see FIG. 5) is also shown in FIG. 6.

Figure 7:
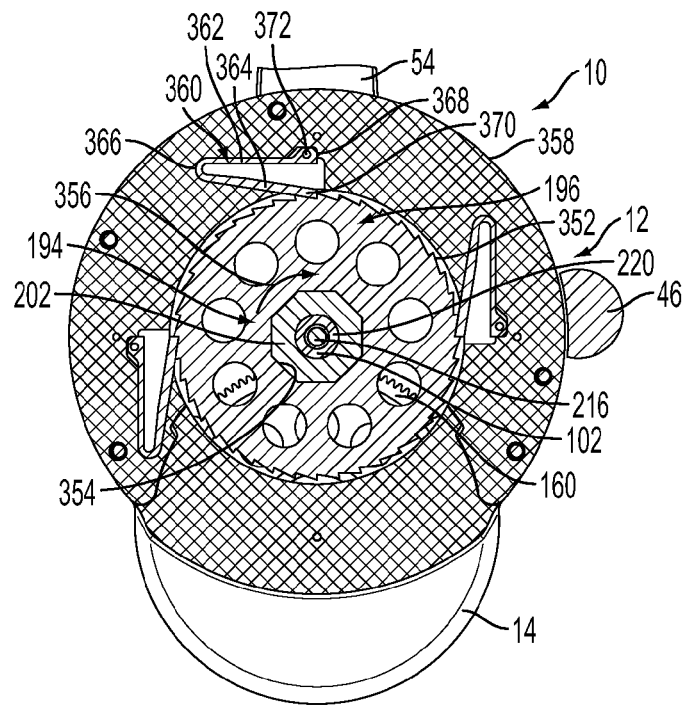
FIG. 7 is a vertical sectional view of a portion of the fishing reel of FIG. 2, taken along line 7-7 of FIG. 2.

FIG. 7, taken along line 7-7 of FIG. 2, illustrates one form of an exemplary anti-rotation mechanism in greater detail. The illustrated mechanism comprises a dog wheel or ring 196 having a plurality of teeth 352 about the periphery of the dog wheel. An interior opening 354 through the dog wheel is octagonal in shape. The periphery of collar section 202 at this location is also octagonal in shape. As a result, the dog wheel is in effect keyed to or mated with the collar portion 194 so as to rotate in the direction indicated by arrow 356 as the handle 40 is turned in the direction of arrow 42 (FIG. 1). In the embodiment of FIG. 7, the teeth 352 are spaced closer to the exterior 358 of the housing than to the spindle section 216 of a spindle 102. A plurality of dogs engage the teeth. The dogs are positioned at spaced apart locations about the periphery of the dog wheel, resulting in more even application and distribution of anti-rotation forces to the dog wheel. In the embodiment of FIG. 7, three such dogs are shown, one being numbered as 360 in FIG. 7. These dogs are positioned approximately 90 degrees apart about the periphery of the dog wheel except that, in this embodiment, the two lower most dogs are approximately 180 degrees apart because a bottom dog is not included. The illustrated dog 360 comprises a flexure element that flexes to allow rotation of the dog wheel in the direction of arrow 356. The dog is biased against the teeth so that, as the dog wheel rotates, the dog is urged into an engagement with each tooth. The tooth and dog are configured to prevent reverse rotation of the dog wheel and thereby reverse rotation of the handle.

With reference to dog 360, a desirable form of dog comprises a flexure element comprising first and second leg portions 362, 364 that are joined together at a proximate end portion 366. The respective distal end portions 368, 370 of the respective leg portions 362, 364 are spaced apart from one another. In the illustrated embodiment, the leg portions 362, 364 diverge moving away from proximate end 366. The distal end portion 368 of the dog is coupled to the housing section, such as fixed in place by a pin 372. The distal end portion 370 engages the respective teeth of the dog wheel as the dog wheel rotates.

Figure 8:
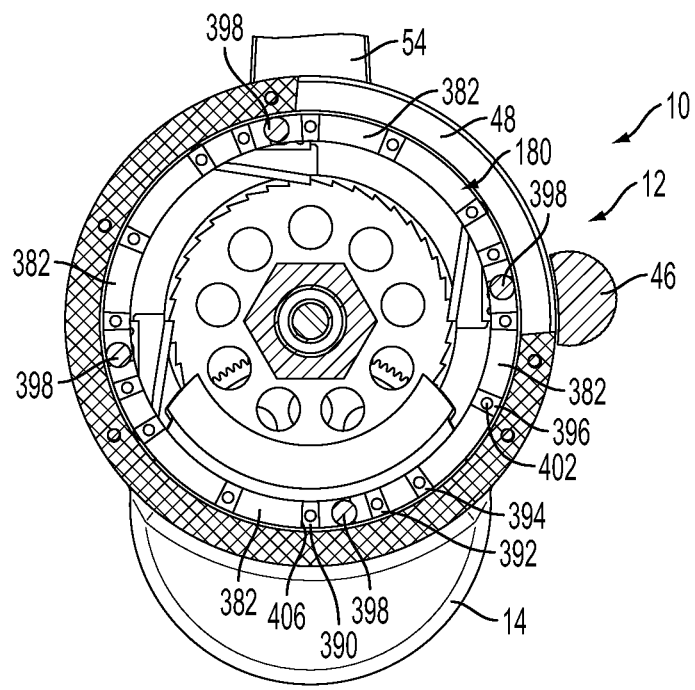
FIG. 8 is a vertical sectional view of a portion of the fishing reel of FIG. 2, taken along line 8-8 of FIG. 2.

An exemplary drag adjustment member and cam member are best understood with reference to FIGS. 4, 8 (comprising a section through the reel taken along line 8-8 of FIG. 2), 11 and 13. As previously mentioned, a cam engager can be carried by a drag adjustment member, such as a drag plate, with a cam being carried by a cam member in a position wherein the cam can be engaged by the cam engager. Alternatively, the cam can be coupled to a drag member with the cam engager supported by a cam member. In the embodiment described with reference to these figures, one or more cam engagers are coupled to a drag adjustment member and one or more cams are coupled to a cam member. Desirably, there are a plurality of cam engagers and cams to distribute the camming forces and provide a more even application of the drag force to the spool. In addition, the use of plural spaced apart cam engagers allows the shifting of a cam lever from a free spool position to a maximum drag position with relatively minimal movement of the lever, such as through an arc of no more than about 60 to 90 degrees.

Figure 13:
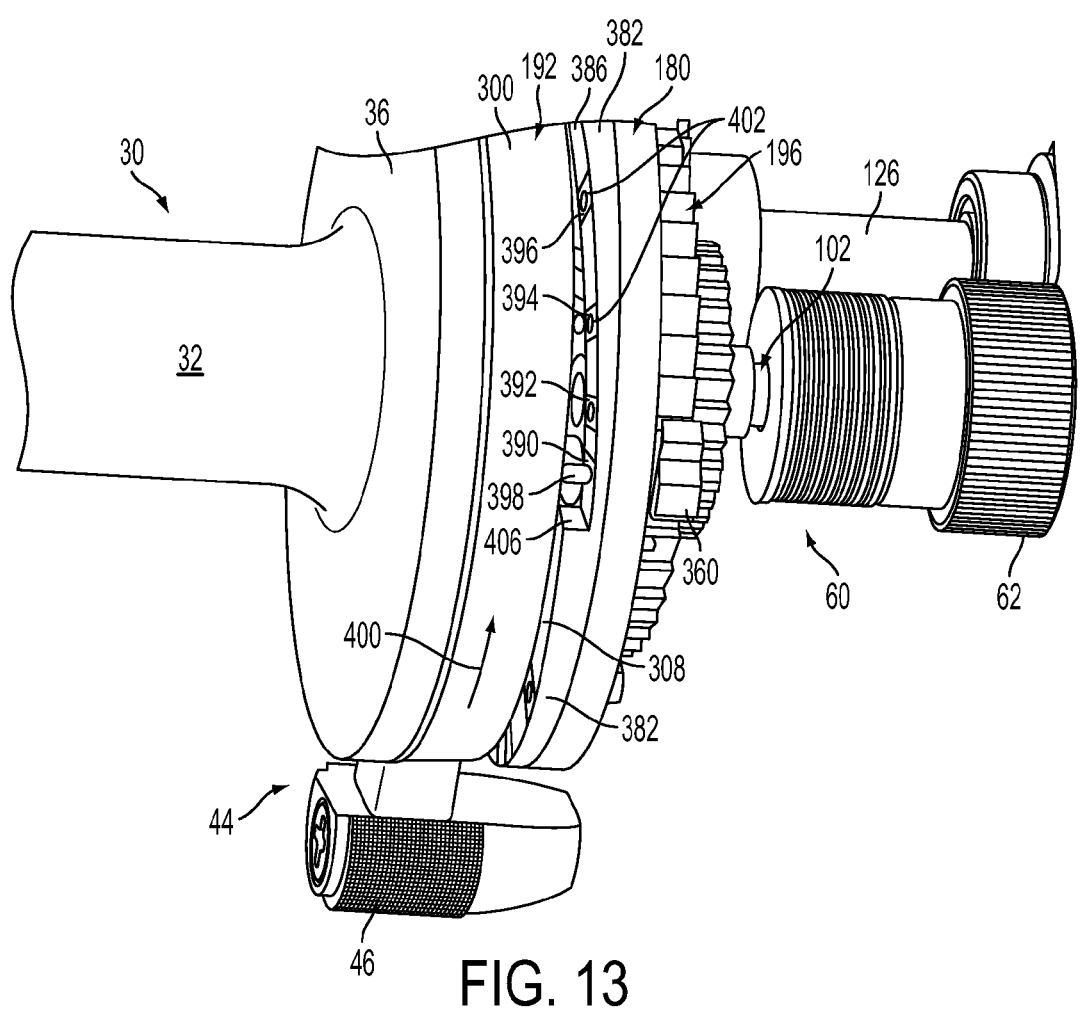
FIG. 13 is a partially broken away top view of the fishing reel of FIG. 2, illustrating portions of one form of drag adjustment member and cam operable to adjust the drag applied to a spool of the fishing reel.

With reference to FIG. 4, an exemplary cam member 180 comprises an annular cam body fixed to the reel housing, in this example to reel housing section 14, such as by a plurality of spaced apart pins, one being indicated at 380 in FIG. 4. With reference to FIG. 13, cam member 180 comprises a ring that supports a plurality of cams, two of which are indicated at 382 in FIG. 13 and four of which are indicated at 382 in FIGS. 8 and 11. Each of these cams can be identical. Consequently, only the cams 382 shown in FIG. 13 will be described in detail. The cams 382 can comprise individual cam sections or more desirably a cam ring secured to cam member 180. Each cam is desirably arcuate in shape and positioned adjacent to or at the periphery of the cam member. The cams are desirably positioned adjacent to the periphery of a drag adjustment member, such as adjacent to the periphery of a drag plate. Camming surface 386 can comprise a plurality of cam segments. For example, three or more such cam segments can be included, such as segments 390, 392, 394 and 396. A ramp section of the camming surface 386 extends between each of the cam segments. The cam segments and ramp sections can comprise one continuously progressive ramp. Alternatively, the cam segments can comprise discrete steps with ramps between the steps. As can be seen in FIG. 13, the height of each of the segments (the distance between the cam surface and the spool end portion 36) decreases from cam segment 390 to cam segment 396. A cam engager in this example, projects toward the camming surface from the drag adjustment member body 300 into engagement with the camming surface. As the drag lever knob 46 is shifted in the direction of arrow 400, the cam adjustment member is shifted axially to the left in FIG. 13 and moves the brake toward the adjacent end of spool end portion 36 to increase the drag force on the spool.

Although various alternative forms of cam surface engagers can be used, in the embodiment of FIG. 13, one form of cam engager comprises a projection, such as a pin 398, extending outwardly from a surface 308 of cam adjuster body 300 against the camming surface 386. Each of the cam segments 390-396 can define a respective cam engager receiving recess, two of which are indicated at 402 in FIG. 13. The recesses 402 receive the distal end of the associated pin 398 when the pin is aligned with the recess so as to positively engage the pin when the pin is moved to a desired drag setting. This provides feedback to the user of the reel that the drag has been set at one of a plurality of desired levels. It should be understood that the cam engager can be positioned at other locations along the camming surface, although the drag adjustment member would tend to slip to a position where the associated pin engages one of the dètentes or recesses.

In the position shown in FIG. 13, the cam surface is spaced furthest from the end 36 of the spool, which corresponds to the lowest drag position. Desirably the lowest drag position is a free spool position where no drag, or minimal drag, is applied to the spool by the brake. A wall 406 adjacent to cam segment 390 can comprise a stop that limits the motion of the drag lever in a direction opposite to the direction 400. The incline of the ramp of the camming surface beyond segment 396 can be shaped such that the lever cannot pivot in direction 400 beyond this section of the camming surface. Alternatively, a stop can be placed in direction 400 following segment 396. As another alternative, the lever receiving slot in the housing can comprise a stop that limits the motion of the lever. In the example where plural cam engagers are employed and the cam engagers comprise projections such as pins 398, the cam engagers can be equally spaced about the perimeter of the drag adjustment member body. This is apparent from the positioning of pins 398 in FIG. 8 (four such pins being shown spaced 90 degrees apart). In addition, four cam segments corresponding and associated with the respective pins are also shown in FIG. 8.

Figure 10:
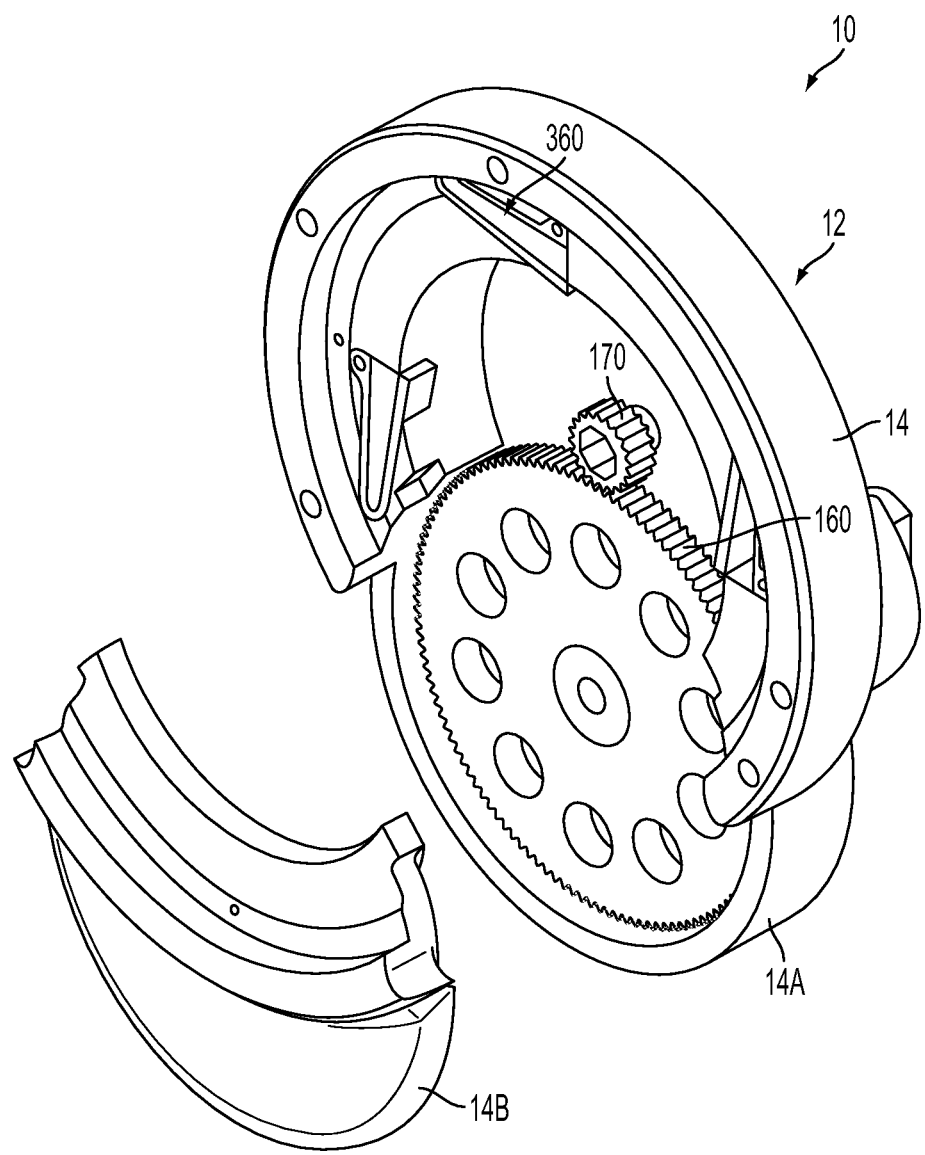
FIG. 10 is a partially exploded view of a portion of the fishing reel of FIG. 2, illustrating one form of drive gearing for the fishing reel and exemplary anti-rotation dog elements mounted to a portion of the housing of the fishing reel.
Figure 11:
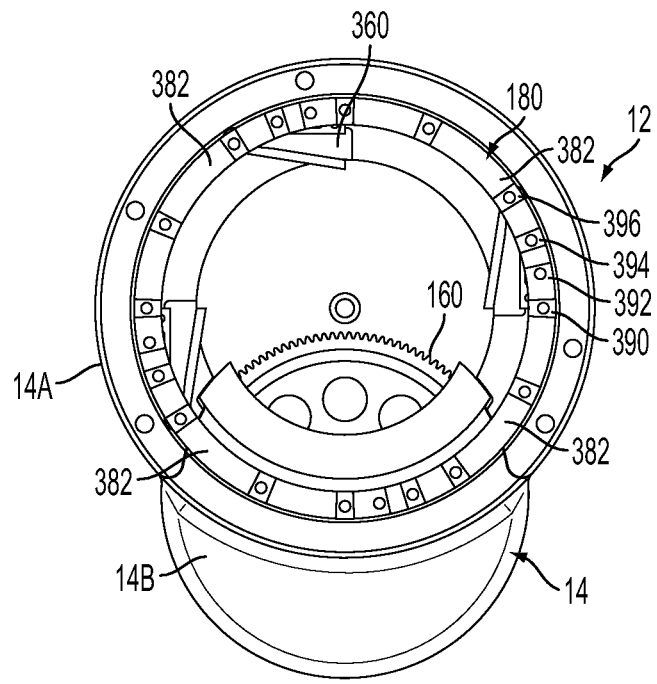
FIG. 11 is an end view of the portion of the fishing reel of FIG. 10, with housing components in their assembled position.
Figure 12:
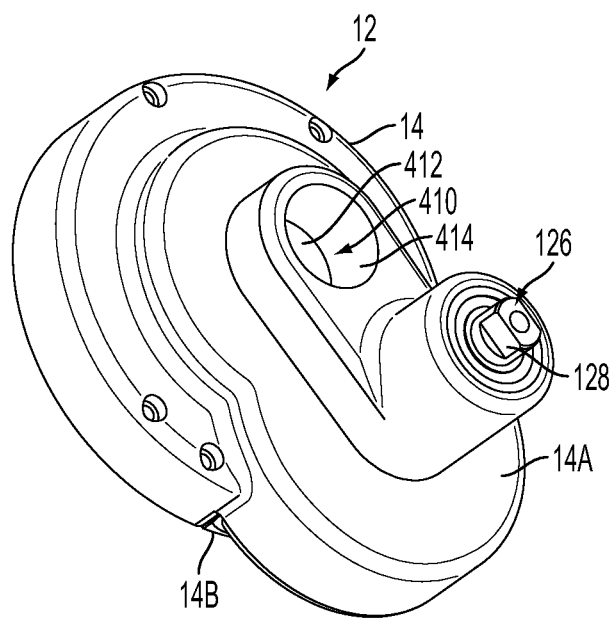
FIG. 12 is a perspective view of the portion of the housing shown in FIG. 10, looking from the opposite direction from that shown in FIG. 10 and with the components assembled.

FIG. 10 illustrates a housing subassembly that supports the gear 170 and drive gear 160 as well as the dogs 360. The housing subassembly 14 comprises housing sections 14 A, 14 B that are shown assembled in FIG. 11. FIG. 12 is a perspective view of the assembled housing sections 14 A, 14 B and also illustrates a distal end portion 128 of the drive shaft 126 projecting outwardly from the housing section 14 A. Housing section 14 A can also define a recess 410 having a base 412 and a side wall 414 for receiving a fine drag adjustment mechanism that can be included in the embodiment of the reel shown in FIG. 4. The spindle can extend through the base of the recess 410. The base 412 and wall 14 of the recess are also shown in FIG. 4.

Figure 14:
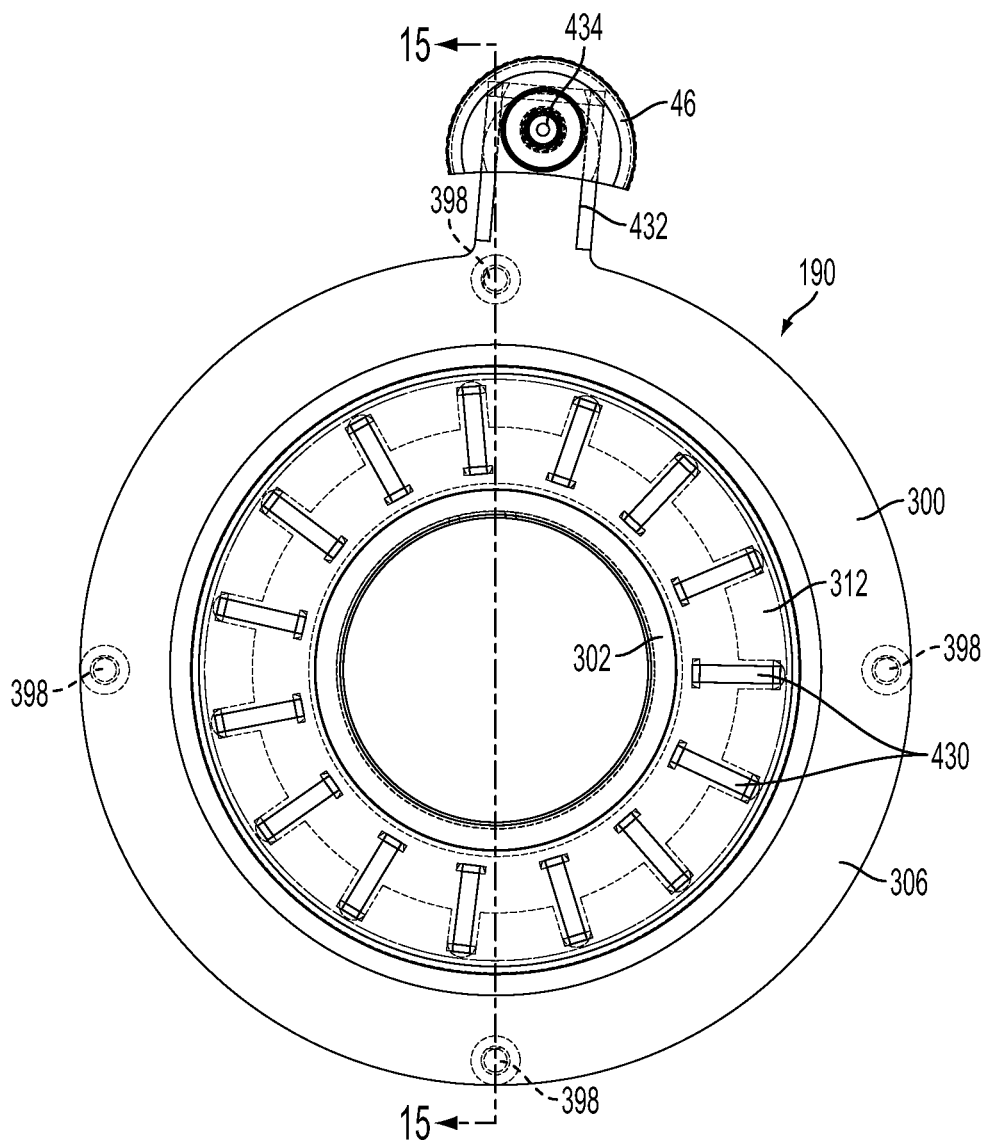
FIG. 14 is a front elevational view of one form of drag adjustment member usable in the embodiment of FIG. 13.
Figure 15:
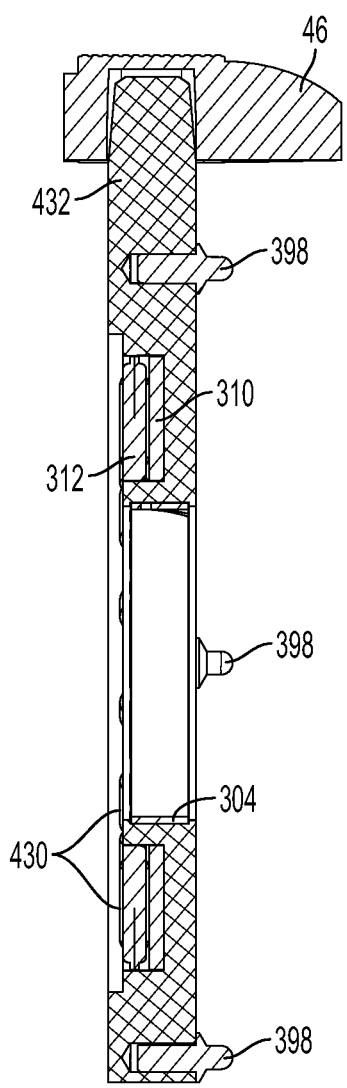
FIG. 15 is a vertical sectional view of the drag adjustment member of FIG. 14, taken along line 15-15 of FIG. 14.

FIGS. 14 and 15 illustrate an exemplary form of drag adjustment member looking toward surface 306 of the body 300 of the adjustment member (surface 306 is the left side surface in FIG. 5). FIG. 14 illustrates the needle thrust bearing 312 in greater detail and shows radially extending needle bearings, two of which are numbered as 430 in this figure. The cam engaging pins 398 are shown in dashed lines in FIG. 14 as they project outwardly from the opposite side of the body 300 of the illustrated cam adjuster. Although other forms of coupling can be used to transmit thrust from the drag adjustment member to the brake, a needle thrust bearing is advantageous.

FIG. 15, taken along line 15-15 of FIG. 14, illustrates the exemplary drag adjustment member in greater detail. Knob 46 can be bolted or otherwise secured to the projecting lever portion 43, such as by a mounting bolt 434 as shown in FIG. 14.

A fine drag adjuster can be included in the illustrated fishing reel. One form of fine drag adjuster will be described with reference to FIGS. 4, 16, and 17.

Figure 16:
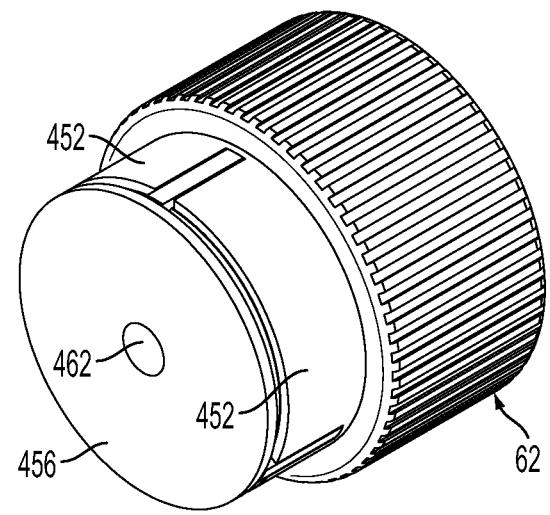
FIG. 16 is an enlarged perspective view of one form of a fine drag adjustment knob assembly usable in the fishing reel of FIG. 2.
Figure 17:
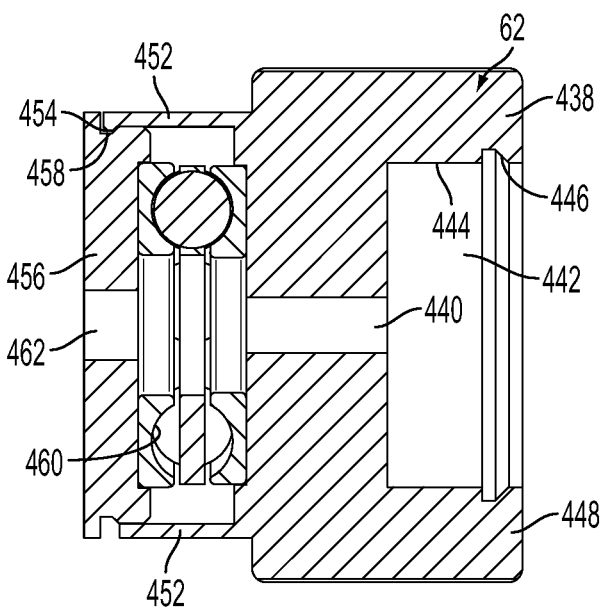
FIG. 17 is a vertical sectional view taken through the center of the knob of FIG. 16.

FIG. 16 illustrates one form of knob 62 that comprises a knob assembly that is best shown in FIG. 17. Knob 62 comprises a body 438 having a central axially extending passageway 440 extending therethrough with an enlarged end chamber 442 bounded by a wall 444. A cap receiving recess 446 extends about the periphery of the wall 444 adjacent to the end 448 of the knob for receiving a cover or cover cap 450 (FIG. 4). The body 62 can comprise plural projecting arcuate flange portions 452 having an inwardly projecting lip 454 (see FIG. 17). An end cap 456 desirably includes a peripheral recess 458 that is sized for receiving the lip 454 of each flange to snap the cap 456 to the knob. A bearing 460 is captured between the cap 456 and the knob. The cap 456 also has an opening 462 therethrough aligned with the opening 440.

As can be seen in FIG. 4, the distal end 464 of spindle 102 extends through the base 412 of the housing recess, through the cap 456 and through the knob opening 440. The knob opening and distal end of the spindle are desirably threaded so that the knob can be threaded onto the spindle end. A snap ring or other stop can be used to prevent removal of the knob. A biasing element, such as a spring or stack of belleville washers, is desirably positioned in the housing recess between cap 456 and the base 412 of the housing recess to exert an outward biasing force on the knob. A spacer of a durable material can be positioned at the base of the recess to protect the housing from wear by the biasing element.

As also can be seen in FIG. 4, housing end section 16 is also desirably coupled to the spindle so as to guide axial motion of the spindle. In one exemplary approach, a recess 472 is provided in an interior surface 474 of housing section 16, the surface 474 facing the end 34 of the spool. The recess 472 has a side wall 476 sized to slidably receive an end portion of the spindle 102, in this case an enlarged guide portion 478 coupled to the spindle. The peripheral surfaces of the guide portion 478 slidably engage the wall 476 of the recess 472 to guide the motion of the spindle in axial directions. The base of the recess 472 can limit the leftward most sliding of the spindle. A thrust bearing 480 recessed into the end portion 34 of the spool retains the bearing 108 in its associated recess 104 while facilitating the application of axial forces to the spool.

In operation, rotation of the fine drag adjustment knob 62 in a first direction of fine adjuster rotation shifts the spindle and spool axially relative to the housing in a first direction of spool motion (to the right in FIG. 4). This also moves the brake member actuation surface (the handle facing surface 262 (FIG. 5) of the spool in this example), toward the surface 306 of the drag adjustment member and toward the surface 260 of the brake member to increase the force of the brake pad 264 on the spool and increase the drag on the spool. In contrast, rotation of the fine drag adjuster in a second direction of fine adjuster rotation that is opposite to the first direction of fine adjuster rotation allows the biasing member 252 to shift the spindle and spool axially relative to the housing in a second direction of spool motion opposite to the first direction of spool motion. This moves the brake member actuation surface 262 of the spool away from the first drag adjustment surface 306 of the drag adjustment member so as to decrease the force of the brake and brake pad on the spool and decrease the drag on the spool.

Figure 18:
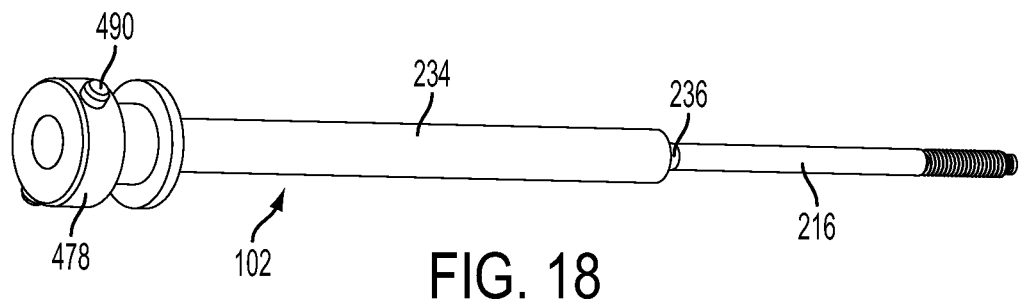
FIG. 18 is a perspective view showing one form of spindle usable in the fishing reel of FIG. 2.
Figure 19:
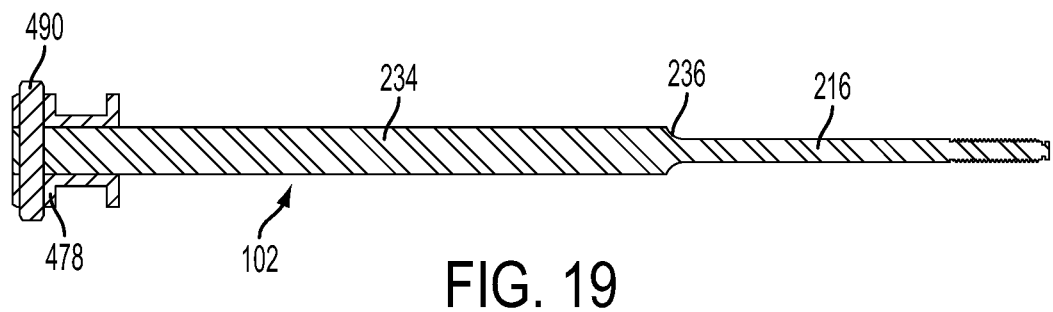
FIG. 19 is a vertical sectional view through the spindle of FIG. 18.

FIGS. 18 and 19 illustrate the exemplary spindle in greater detail. The spindle axial motion guide 478 can comprise an anti-rotation element, such as a pin 490, operable to secure the guide to the spindle and to fit within grooves (one being indicated at 492 in FIG. 4) in the wall 476 of the guide receiving recess 472 (FIG. 4). The projecting pin ends of the pin 490 can slide axially within the receiving grooves.

Figure 9:
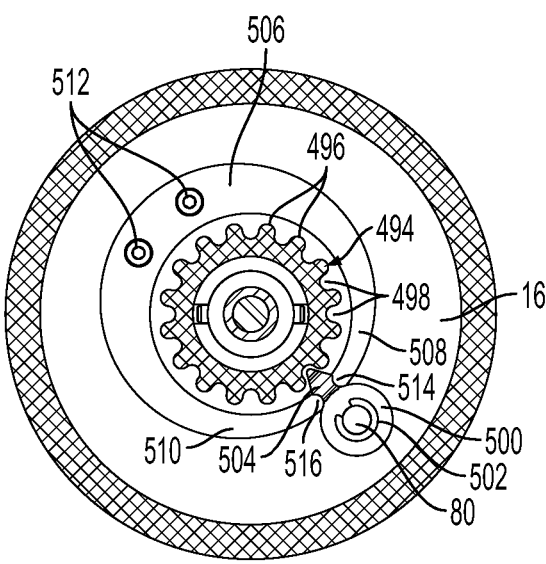
FIG. 9 is a vertical sectional view of a portion of the fishing reel of FIG. 2, taken along line 9-9 of FIG. 2.
Figure 20:
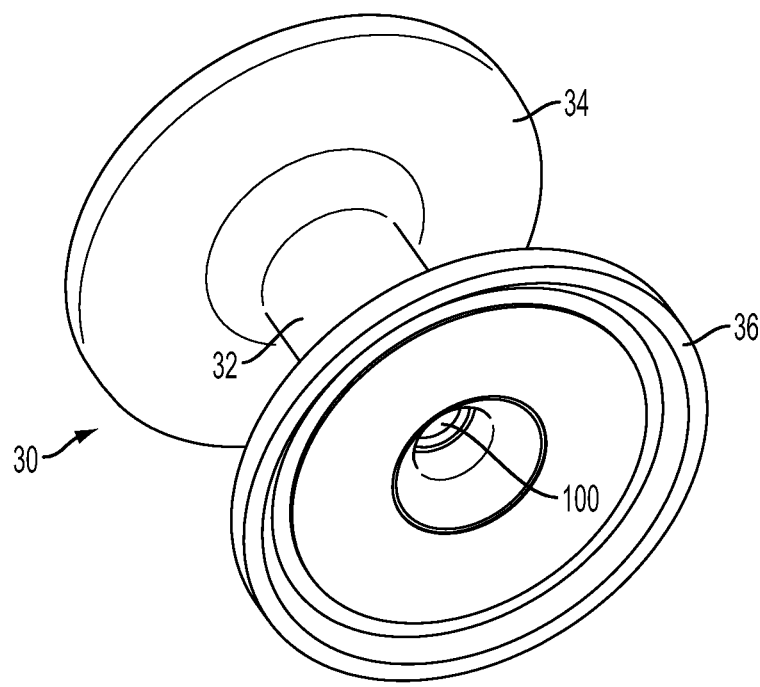
FIG. 20 is a perspective view of a spool usable in the embodiment of FIG. 2.
Figure 21:
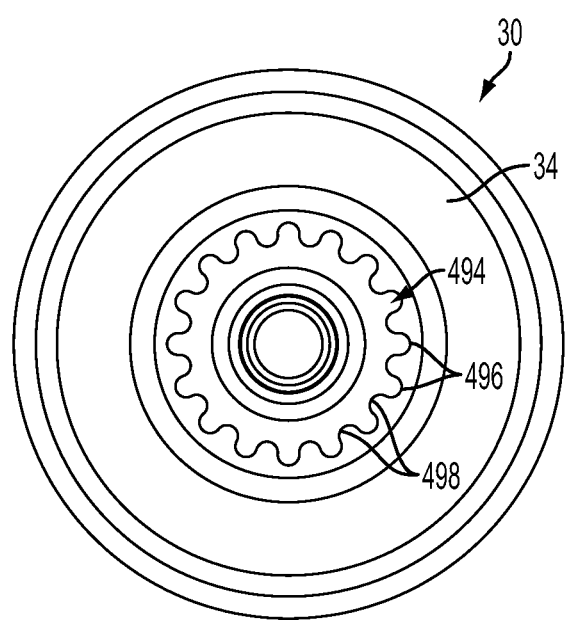
FIG. 21 is an end view of the spool of FIG. 20, looking from the opposite end from the end shown in FIG. 20.

FIGS. 20 and 21 illustrate an exemplary spool. FIG. 21 illustrates a portion of a click mechanism 81 (FIG. 4) that can be included in the reel. In the embodiment of FIG. 21, a click ring 494 projects toward the end of housing section 16 from the spool. The click ring comprises plural rounded lobes, two of which are indicated at 496 in FIG. 21, separated by rounded recesses, two of which are indicated by the number 498 in FIG. 21. With reference to FIG. 9, taken along line 9-9 of FIG. 2, and FIG. 21, an exemplary click mechanism will be described. The button 80 comprises a post extending through a slot 82 (FIG. 3) in the end wall of housing section 16. A clicker or click generating element 500 (FIG. 9) is secured to the post portion of the button, such as by a snap ring 502. A projecting neck portion 504 of the clicker extends toward the click ring 494 into recesses between the lobes when the clicker is in the click generating or click engaged position. A crescent shaped spring 506, having first and second leg portions 508, 510 is secured, such as by pins 512, to the housing section. Projection 504 has necked-in portions that receive respective ends 514, 516 of the spring 506. With the clicker in the click engaged position, and as the reel spool rotates, the lobes 496 engage the projection 504 resulting in one of the end portions of the spring being pushed outwardly as the spool turns. After the lobe passes the projection 504, the spring snaps the projection into the next gap between lobes and cause a click to sound. As the reel spool rotates, repetitive clicks are generated. In contrast when the button 80 is shifted to a non-click engaged position, the projection 504 is spaced from the lobes. Other forms of click mechanisms can be used or the click mechanism can be eliminated.

The embodiment of FIGS. 22-27 has many features in common with the above-described embodiments. However, one significant difference between the embodiments is that the embodiment of FIG. 22 employs a planetary gear drive system. In addition, an alternative form of anti-rotation system is shown. It should be understood that the drive mechanism shown in the embodiments of FIGS. 1-21 can be replaced with a different drive system such as a planetary gear system or a plural speed gear system wherein the drive gearing ratio is adjusted. For convenience, in FIGS. 22-27, components in common with those shown in the embodiments of FIGS. 1-21 have been given the same numbers and will not be discussed in detail.

Figure 22:
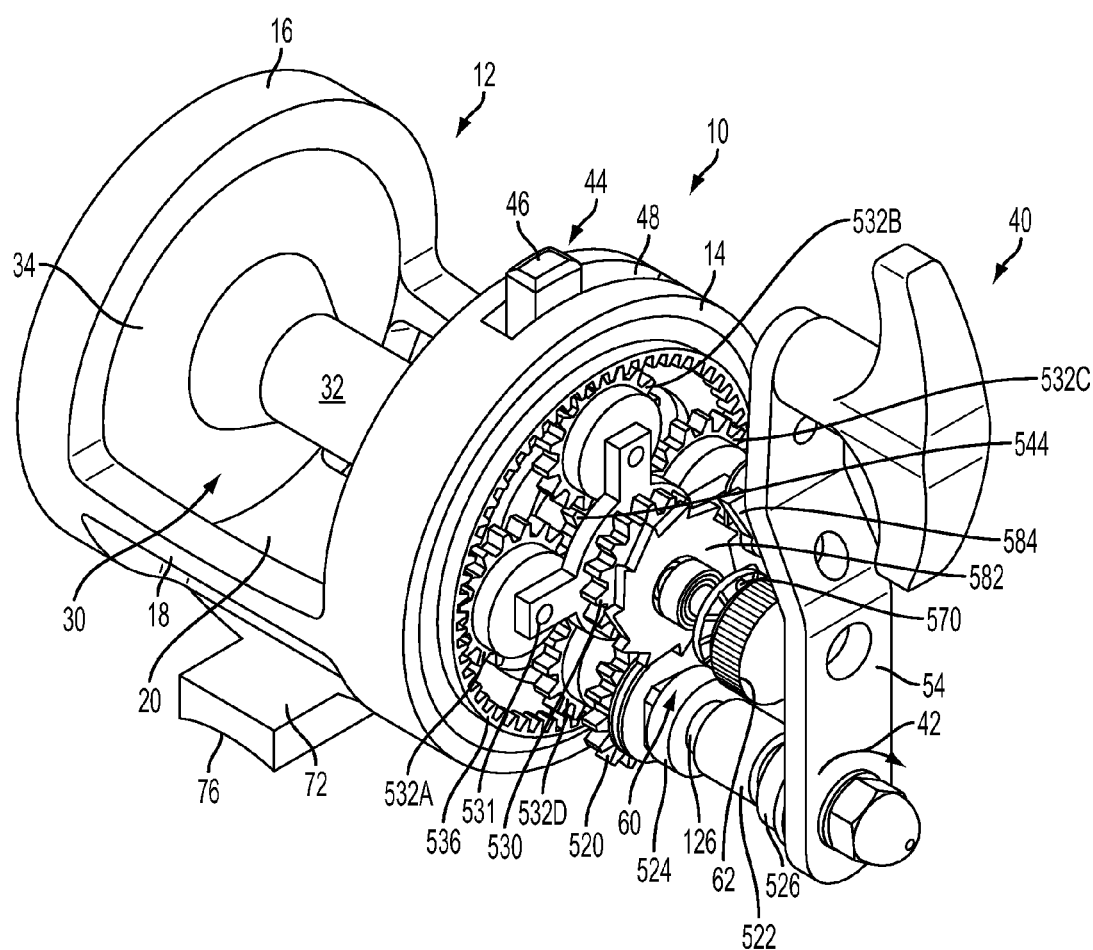
FIG. 22 is a partially broken away view of an alternative embodiment of a fishing reel illustrating an exemplary planetary gear drive mechanism for a fishing reel.

In FIG. 22, like FIG. 1, the handle 40 and handle arm 54 are on the right side of the reel (note, the handle can be on the left side if desired, but for convenience a right side reel handle is described below) is turned in a clockwise rotation as indicated by arrow 42. The handle arm 54 can be drivingly coupled to a drive shaft 126. The drive shaft 126 includes an attached drive gear 520 and also can have a one way needle bearing 522 to prevent the drive shaft 126 and handle arm 54 from moving in a counter clockwise direction of rotation. There are also two bearings 524, 526 on either side of the needle bearing to pivotally couple the drive shaft 126 to the housing and to bear the load and torque of the rest of the gearing.

When the drive gear 520 is rotated clockwise by turning the reel handle, a planet carrier gear 530 engaged by the drive gear is rotated in a counter clockwise direction. When the planet carrier gear 530 is rotated, a planet gear carrier 531 is rotated to move plural planet gears, in this example four planet gears 532 A-D, in a clockwise rotation because the planet gears engage a stationary ring gear 536 that is fixed to the housing. The ring gear is coaxial with the axis of a sun gear 544 and the ring gear in this example is mounted to an interior circumferential mounting surface of the housing section 540. In an alternative construction, the ring gear is rotatable relative to the housing and coupled to the sun gear to drive the sun gear with the planet gears being non-rotatable. A second housing section 542 covers the gears and other mechanical components of the reel. The four planet gears 532 A-D engage the spool drive or sun gear 544 that is located in the center of the planet gears and surrounds the axis of a spool spindle 102. When the four planet gears are rotated, the sun gear 544 is rotated in this example in a counter clockwise direction. The sun gear is coupled to a spool 30 by a drag mechanism (such as previously discussed) so that the sun gear (when the drag is tight enough to overcome resistance to retrieving the line), when turned in the counter clockwise direction of rotation, turns the spool in a counter clockwise direction of rotation to retrieve the line, such as when fighting a fish or to make another cast.

The drag mechanism in this embodiment can also comprise a two part drag applying mechanism, such as previously described, namely a drag lever actuated mechanism that can be operable to adjust the drag between predetermined drag levels and a fine drag adjust mechanism.

Figure 23:
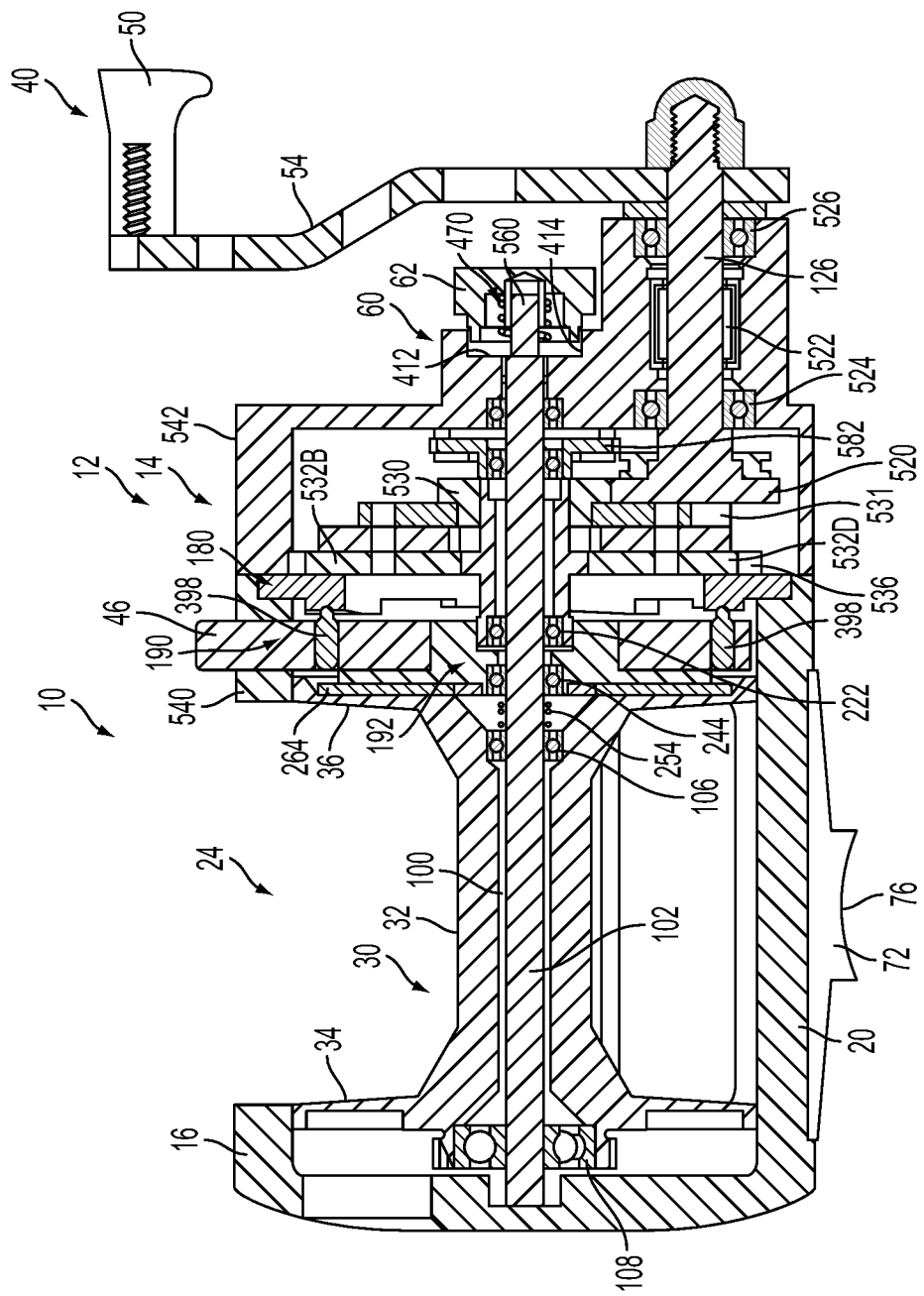
FIG. 23 is a vertical sectional view of the fishing reel of FIG. 22.
Figure 24:
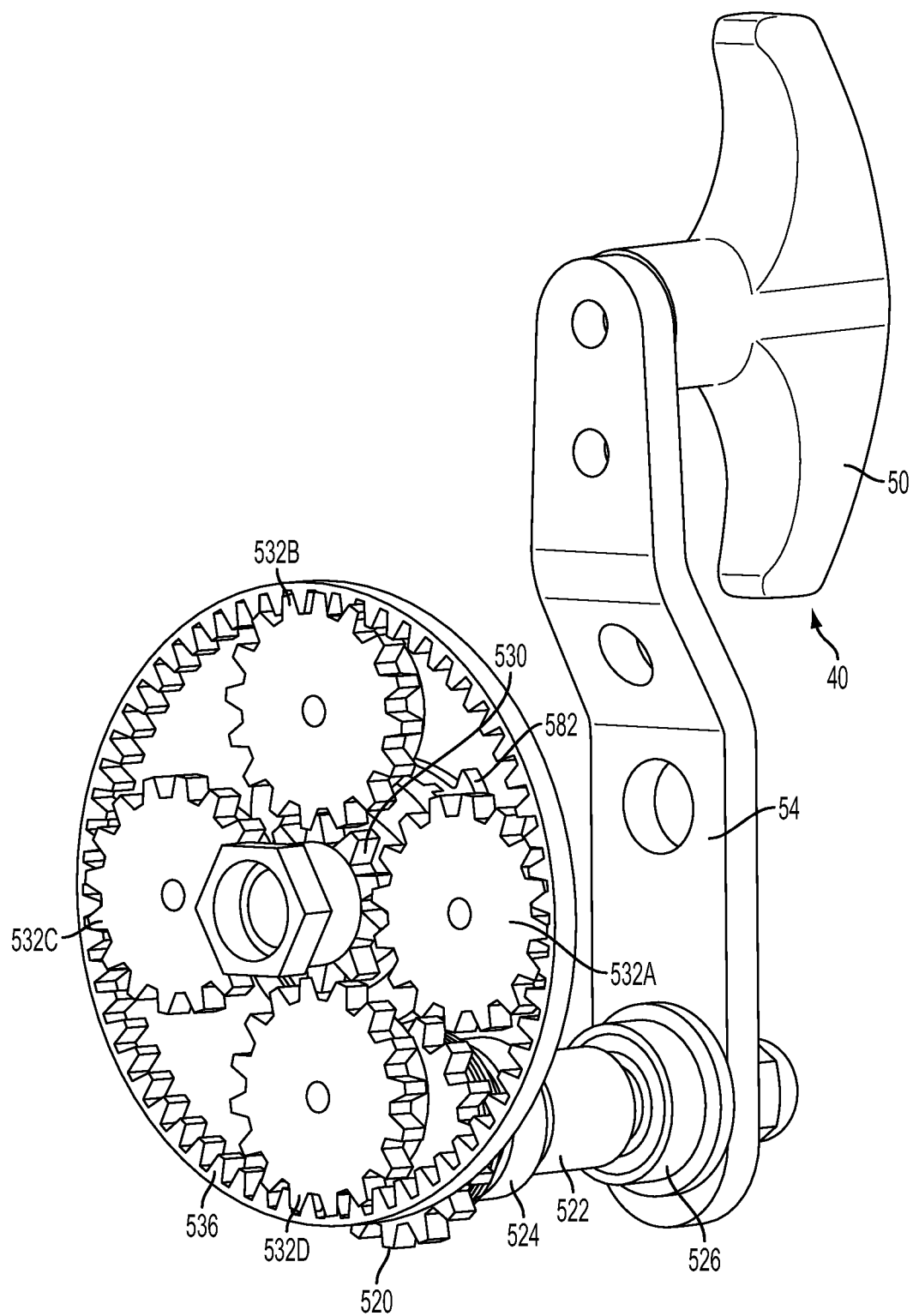
FIG. 24 is an enlarged view of a portion of the drive mechanism of FIG. 22, looking from the opposite direction from that shown in FIG. 22.
Figure 25:
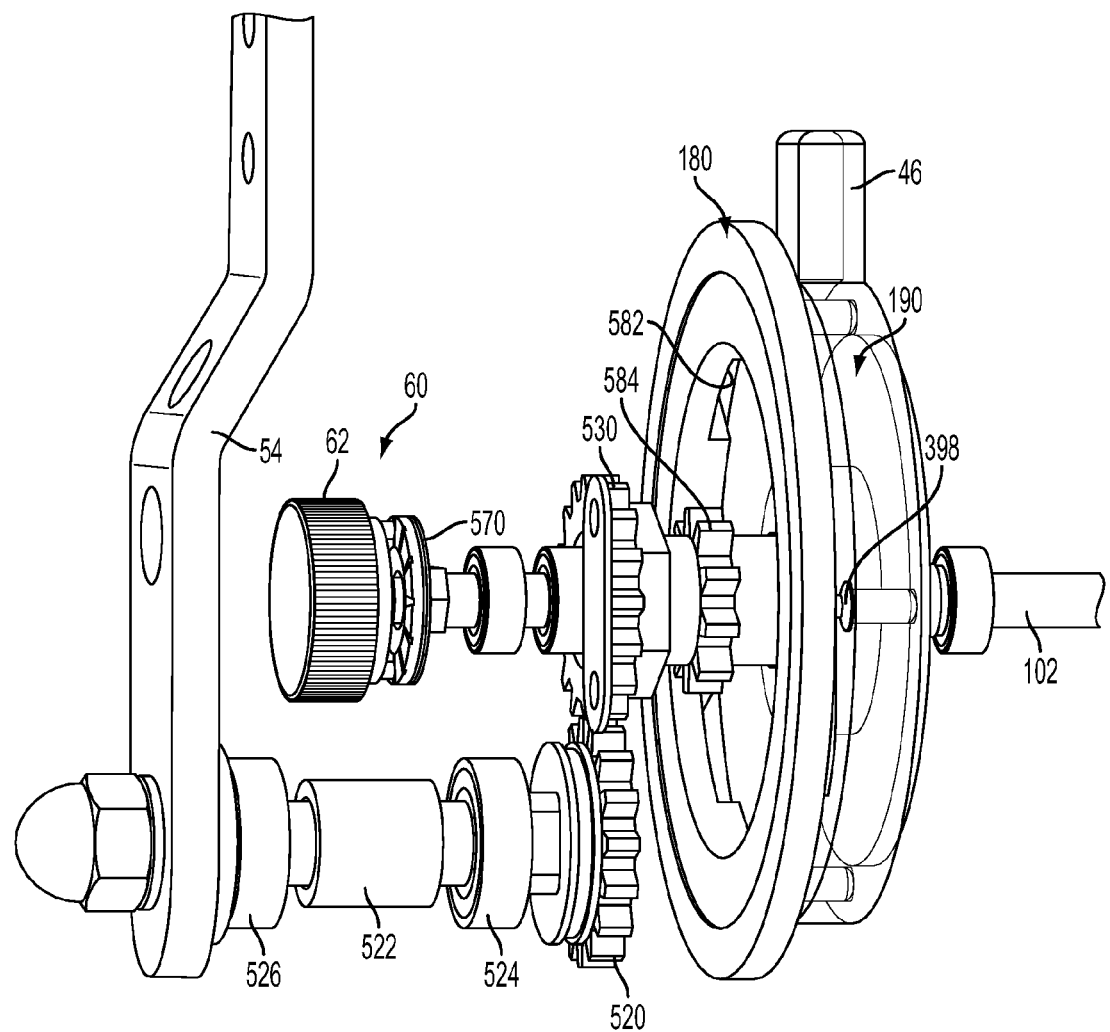
FIG. 25 is a side view of a portion of the fishing reel of FIG. 22, illustrating the exemplary drive mechanism with planet gears and an anti-rotation mechanism removed for convenience.
Figure 26:
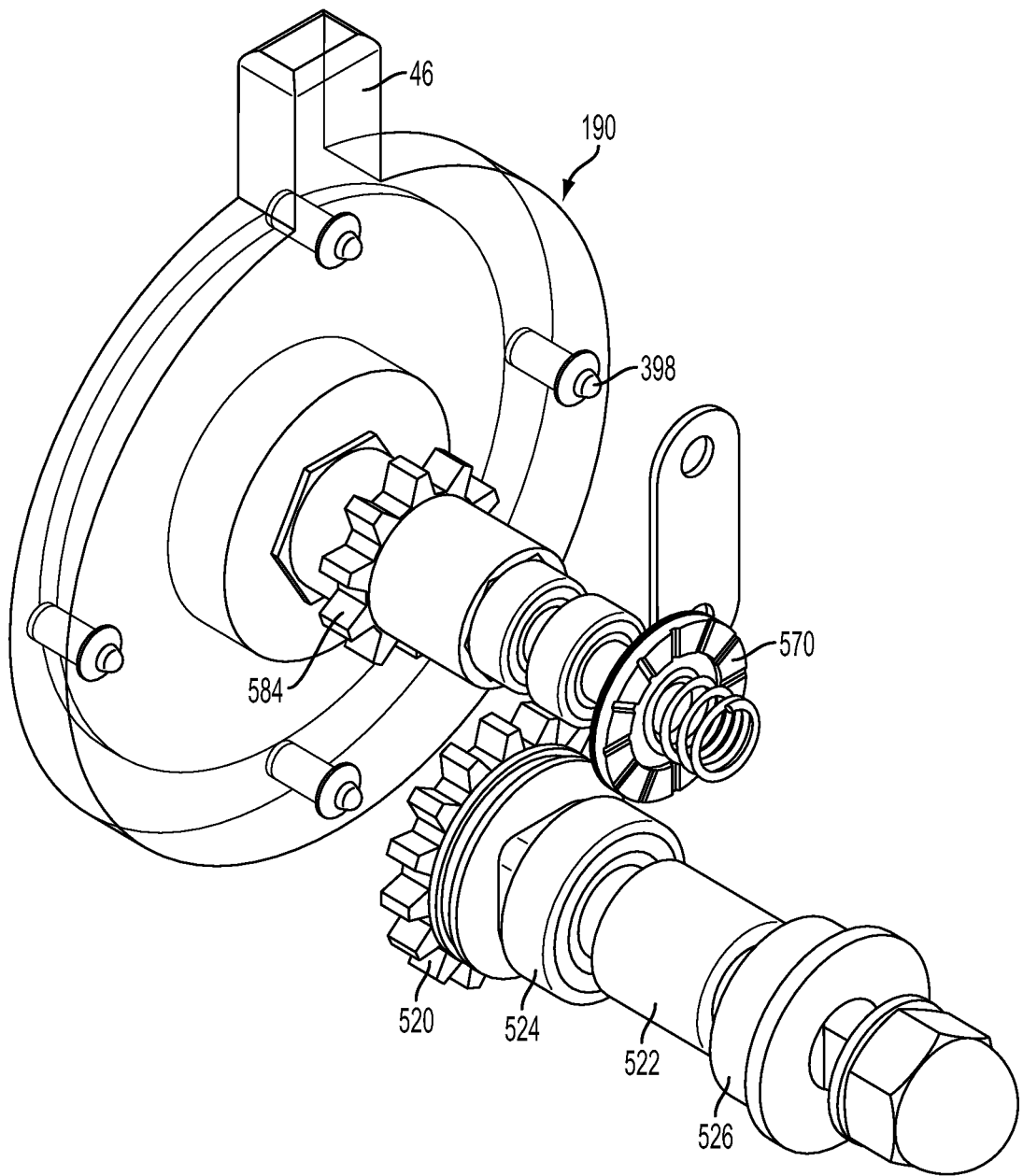
FIG. 26 is an end view of the mechanism of FIG. 25, with additional components removed.
Figure 27:
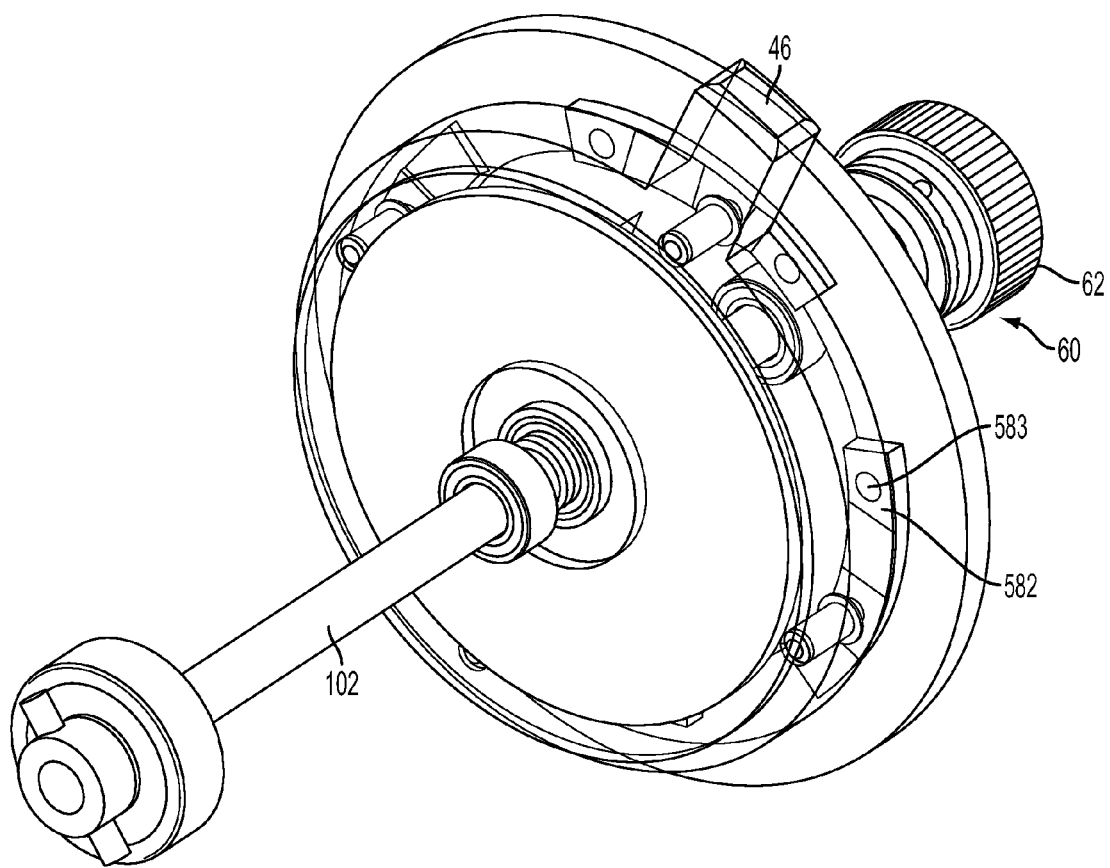
FIG. 27 is an enlarged perspective view of an alternative form of drag adjustment member and cam assembly usable in fishing reel embodiments.

The operation of an exemplary embodiment of a fine drag adjust mechanism of the embodiment of FIGS. 21-23 is as follows. The spool spindle 102 in this example passes through the approximate center of the reel and has a projecting end portion 560 that extends to the right in FIG. 23 beyond the housing in this embodiment. The projecting end portion 560 of the spindle is positioned just above the drive shaft 126. The distal or end of the spindle (right side) is desirably threaded and receives a fine drag tuning preset knob 62 that can adjust the amount of compression from a brake member 192 to a brake pad 264 and to the spool. The more the fine adjustment preset knob is tightened, the more the spool is shifted by axially shifting of the spindle to compress the brake disc against the brake member. Conversely, the more the fine adjustment knob is loosened, the less the compression by the spool of the brake disc against the brake member. This preset knob desirably only acts as a fine tuning system, meaning it cannot put the reel in gear or out of gear (it does not allow free spooling of the spool 30). This preset knob also can have a clicking feature (via clicking washer 570) so the operator receives an auditory indication of setting of the fine drag adjuster.

To increase the compression when the preset knob is tightened, at least one compression spring 470 is positioned between the preset knob 62 and clicking washer 70 and at least one compression spring 254 is positioned between the right side of the spool 30 and the brake disc member 192. Tightening the knob 62 moves the brake pad 264 to the right in FIG. 23 and compresses the brake pad to a greater extent against a brake disc portion of the brake member. In contrast, loosening the knob 62 results in the brake pad 264 moving away from the brake disc portion of the brake member and reduces the compression of the brake pad against the brake disc. As a result, the drag pressure is adjusted.

The exemplary embodiment of a drag lever actuated drag mechanism illustrated in FIGS. 21-27 is like the previously described mechanism. In this example, a cam member comprising a cam plate 180 is located on the inner circumference of the housing to the left of the ring gear 536 (closer to the spool 30) and is provided with plural cam surfaces (one being indicated at 582 in FIG. 27) with one cam surface being provided for each cam surface engager. In the illustrated embodiment, there are plural (in this case four) cam surfaces and a cam surface engager associated with each cam surface (one being indicated at 398 in the figures and comprising the projecting end of a plunger or pin). A drag lever adjuster 190, such as a drag lever plate, is supported for pivoting movement relative to the housing and can carry the plungers at respective desired locations, such as spaced 90 degrees apart about the axis of rotation of the drag lever plate and adjacent to the periphery of the drag lever plate. The cam surface engagers can each function as a contact or pivot point for the lever to move the reel in gear or out of gear.

Each of the cam surfaces of the cam plate can have respective circumferentially spaced apart recesses (one being indicated at 583 in FIG. 27) that define drag settings. The plunger tips ride on an associated cam surface and are pivoted by a lever coupled to the drag lever plate between the recesses to move the drag setting between the predefined drag settings. For example, one setting can be for free spool (minimal drag), one setting can be the maximum drag, and one setting can be for an intermediate drag setting (such as typically used when playing a fish or waiting for a fish to strike. More or fewer settings can be used. The drag lever 46 projects outwardly through a slot 48 in the housing section 14 (FIG. 22) and slides in the slot when the drag lever is pivoted to pivot the drag lever plate. Relatively little pivoting movement of the drag lever (e.g., less than or equal to ninety degrees and in this embodiment less than or equal to 60 degrees) is needed to pivot the drag lever plate to move the cam surface engagers between all of the various drag settings. Movement of the drag lever plate in a direction that increases the drag moves the brake disc portion of the brake member 192 toward the brake pad. In contrast, movement of the drag lever plate in a direction that decreases the drag moves the brake disc portion of the brake member away from the brake pad. When the drag lever plate is in a particular drag setting position, the fine drag mechanism can be operated to further adjust the drag. The cam surfaces can gradually or more abruptly change in height from one setting to another. In this example, the lowest cam surface height (projecting the least extent toward the drag lever plate) corresponds to the minimum or free spool stage, the middle cam surface height corresponds to an engaged stage (the drag plates are now ready to touch or are touching to creating drag pressure), and the highest cam surface height corresponds to the maximum drag and can be a drag setting that the angler does not want to exceed and that can be a setting that the angler has already adjusted to using the preset knob. The intermediate engaged stage is where most of the fighting of a fish occurs and the drag pressure at this setting can be adjusted by using the preset or fine adjustment knob. By providing the cam plate with plural (desirably three or more and in this example four) pivot points, more even distribution of drag pressure from the drag lever plate to the brake pad and brake disc is achieved.

To create an anti-reverse system to keep the gears from turning the wrong direction during a fish fight, a dog system can be included. In the illustrated embodiment of FIG. 22, the dog system is located on the right side of the planet carrier gear and comprises a dog gear 582 that cooperates with a dog 584 that is biased against the dog gear to restrict the planet carrier gear, planet gears, and sun gear from rotating opposite to the intended rotational direction. The needle one way bearing 522 can also be positioned onto the drive shaft 126 to restrict the drive gear and handle from rotating in an undesired direction. The needle bearing also prevents slop (play) from the dog system reaching the handle or spool.

The gearing, spindle, crank arm and other reel components can be made of a durable corrosion resistant material, such as titanium and or stainless steel. Anodized aluminum or other metals can be used for reel components. As one example, the housing can be made of a magnesium alloy. The housing and can also comprise components comprising cut or powdered carbon fibers, and/or carbon fiber twill, with a binder. The reel is not limited to any specific materials.

As used herein, the terms "a", "an" and "at least one" encompass one or more of the specified element. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A," "B," "C," "A and B," "A and C," "B and C" or "A, B and C." As used herein, the term "coupled" generally means mechanically, chemically, magnetically or otherwise physically coupled or linked and does not exclude the presence of intermediate elements between the coupled items, unless otherwise described herein.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A fishing reel comprising:
   a housing having an interior and an exterior;
   a spindle coupled to the housing, the spindle having a longitudinal spindle axis;
   a fishing line spool comprising first and second spool end portions at opposite ends of the spool and a spool body portion between the first and second spool end portions, the housing having a first spool end receiving portion and the first spool end portion having a first outer perimeter at least partially surrounded by the first spool end receiving portion with a first gap between the first spool end portion and the first spool end receiving portion, the housing having a second spool end receiving portion and the second spool end portion having a second outer perimeter at least partially surrounded by the second spool end receiving portion with a second gap between the second spool end portion and the second spool end receiving portion, the spool defining a spindle receiving opening extending axially through the spool, the spool being rotatably coupled to the spindle with the spindle positioned in the spindle receiving opening such that the spool is rotatable relative to the spindle;
   a brake member rotatably supported by the spindle within the interior of the housing for rotation relative to the spindle, the brake member comprising a braking surface positioned within the interior of the housing to face one of the first and second spool end portions, said one of the first and second spool end portions comprising a brake member actuation surface facing the interior of the housing at a location opposed to the braking surface, at least one brake disc mounted to said brake member actuation surface and positioned at least partially between the braking surface and the brake actuation surface, and wherein a passageway is provided that communicates between the exterior of the housing, through one of the first and second gaps and to the location within the housing where the brake disc and braking surface are positioned;
   a drag adjustment member rotatably coupled to the spindle and axially movable relative to the spindle axis, the drag adjustment member also being rotatable relative to the brake member, the drag adjustment member comprising opposed first and second drag adjustment surfaces, the first drag adjustment surface facing the brake member actuation surface;
   a cam member coupled to the housing in a fixed position relative to the housing, the cam member comprising a first cam member surface facing the second drag adjustment surface, one of the first cam member surface and the second drag member surface comprising a cam coupled thereto and the other of the first cam member surface and second drag member comprising at least one cam engager positioned to engage the cam, the cam being configured such that rotation of the drag adjustment member about the spindle and relative to the cam member in a first direction of rotation results in the cam and cam engager moving the drag adjustment member axially toward the spool to thereby move the brake member and braking surface toward the brake actuation surface and rotation of the drag adjustment member about the spindle and relative to the cam member in a second direction of rotation opposite to said first direction or rotation results in the cam and cam engager moving the drag adjustment member axially away from the spool to thereby allow the brake member and braking surface to move away from the brake actuation surface, and wherein the movement of the drag adjustment member toward the spool increases the force of the brake disc on the spool and increases the drag on the spool and movement of the drag adjustment member away from the spool reduces the force of the brake disc on the spool and decreases the drag on the spool;
   a first biasing member positioned to bias the spool away from the brake member;
   the drag adjustment member comprising a drag adjustment member position adjustment projection extending outwardly from the housing;
   a fine drag adjuster rotatably coupled to the housing for rotation about the spindle axis, the fine drag adjuster being coupled to the spindle such that rotation of the fine drag adjuster in a first direction of fine adjuster rotation shifts the spindle and spool axially relative to the housing in a first direction of spool motion and moves the brake member actuation surface of the spool toward the first drag adjustment surface of the drag adjustment member to increase the force of the brake disc on the spool and increase the drag on the spool, and such that rotation of the fine drag adjuster in a second direction of fine adjuster rotation that is opposite to said first direction of fine adjuster rotation allows the first biasing member to shift the spindle and spool axially relative to the housing in a second direction of spool motion opposite to the first direction of spool motion to move the brake member actuation surface of the spool away from the first drag adjustment surface of the drag adjustment member so as to decrease the force of the brake disc on the spool and decrease the drag on the spool; and
   a handle rotatably coupled to the housing and drivenly coupled to the spool by the drag applied to the spool by the cam member, drag adjustment member and brake such that rotation of the handle in one direction of handle rotation rotates the spool in one spool rotation direction about the spindle to take up fishing line onto the spool.

2. A fishing reel according to claim 1 wherein the cam comprises at least one cam element projecting outwardly from said one of the first cam member surface and the second drag member surface toward the other of the first cam member surface and second drag member surface, the cam element comprising a plurality of cam segments that each project outwardly a different distance, a first cam segment projecting outwardly a first distance, a second cam segment projecting outwardly a second distance and a third cam segment projecting outwardly a third distance, wherein the first distance is less than the second distance, and wherein the second distance is less than the third distance; and
   wherein the at least one cam engager comprises a projection having a distal end portion configured to abut the cam segments, wherein rotation of the drag adjustment member in the first direction of rotation moves the distal end portion in a direction from the first toward the third cam segments to increase the drag, and wherein rotation of the drag adjustment member in the second direction of rotation moves the distal end portion in a direction from the third toward the first of the cam segments to thereby decrease the drag, wherein engagement of the distal end portion with the first cam segment results in a first drag setting corresponding to a first drag on the spool, wherein engagement of the distal end portion with the second cam segment results a second drag setting corresponding to a second drag on the spool that is greater than the first drag on the spool, and wherein engagement of the distal end portion with the third cam segment results in a third drag setting corresponding to a third drag on the spool that is greater than the second drag on the spool.

3. A fishing reel according to claim 2 wherein the first drag setting corresponds to a minimum free spooling drag setting.

4. A fishing reel according to claim 2 wherein each of the cam segments comprises a recess configured to receive the distal end portion of the cam engager upon moving the distal end portion into a position in alignment with the recess to thereby positively engage the distal end portion with the segment while permitting movement of the distal end portion out of the recess upon rotation of the drag adjustment member.

5. A fishing reel according to claim 4 comprising a first ramp positioned between the first cam segment and the second cam segment and a second ramp positioned between the second cam segment and the third cam segment, wherein the distal end portion of the cam slides along the respective first ramp when moved between the first and second cam segments and slides along the second ramp when moved between the second and third cam segments.

6. A fishing reel according to claim 2 comprising a plurality of said cam elements and a plurality of cam engagers, each cam engager being associated with and positioned to engage a respective associated one of the cam elements.

7. A fishing reel according to claim 6 wherein the cams and cam engagers are positioned such that each cam engager is simultaneously engaged with the first cam segment of the associated cam when the drag adjustment member is rotated to at least one position of adjustment, is simultaneously engaged with the second cam segment of the associated cam when the drag adjustment member is rotated to at least one second position of adjustment, and is simultaneously engaged with the third cam segment of the associated cam when the drag adjustment member is rotated to at least a third position of adjustment.

8. A fishing reel according to claim 6 wherein there are four of said cam elements and cam engagers, the cams being mounted to or comprising a portion of the cam member, the cam member comprising an annular cam member supporting the cams at or adjacent to the periphery of the cam member, the cam elements comprising arcuate cam elements, the cams being equally spaced about the periphery of the annular cam member.

9. A fishing reel according to claim 1 wherein the cam comprises plural spaced apart cam elements projecting outwardly from said one of the first cam member surface and the second drag member surface toward the other of the first cam member surface and second drag member surface, and wherein the cam elements each comprise a cam surface with cam surface portions that project outwardly differing distances, the fishing reel further comprising plural cam engagers, each cam engager being associated with and positioned to engage the cam surface of a respective one of the cam elements.

10. A fishing reel according to claim 9 wherein the cam elements each comprise an arcuate cam surface, the cam surface comprising a plurality of spaced apart recesses positioned for engagement by the associated cam engager.

11. A fishing reel according to claim 10 wherein the cam member comprises an annular cam member with an outer periphery and wherein the cam elements are coupled to the cam member at or adjacent to the outer periphery of the cam member.

12. A fishing reel according to claim 1 comprising an annular needle thrust bearing positioned between the first drag adjustment surface and the brake member actuation surface with the spindle passing through the thrust bearing.

13. A fishing reel according to claim 12 wherein the first drag adjustment surface defines a thrust bearing receiving recess within which the thrust bearing is positioned.

14. A fishing reel according to claim 1 comprising a support comprising a first end portion, and intermediate portion and a second end portion, the support defining a spindle receiving passageway extending axially through the support, the support being rotatable relative to the spindle, the first end portion being drivenly coupled to the handle such that the support is rotated in response to rotation of the handle in said one direction of handle rotation, the brake member comprising a brake collar portion carried by the second end portion of the support and axially slidable relative to the support, the drag adjustment member being rotatably carried by the brake collar portion.

15. A fishing reel according to claim 14 comprising a dog wheel carried by the support and rotatable with the rotation of the support, the dog wheel comprising a periphery that comprises dog teeth spaced about the periphery of the dog wheel, the dog wheel being supported within the housing so as to rotate relative to the spindle, a plurality of spaced apart dog elements coupled to the housing and configured to engage the dog teeth, the dog elements and dog teeth being shaped to allow rotation of the handle in the one direction of handle rotation and to restrict the rotation of the handle in a direction of handle rotation opposite to said one direction of handle rotation.

16. A fishing reel according to claim 1 wherein the housing comprises first and second housing end portions with a spool receiving chamber defined therebetween, the spindle comprising first and second end portions, a first housing end portion defining a first adjuster receiving recess having a base and a side wall, the first end portion of the spindle extending through the fine adjuster receiving recess, the second housing end portion being coupled to the second end portion of the spindle, the fine drag adjuster comprising a fine adjustment knob threaded onto the first end portion of the spindle and positioned partially in the adjuster receiving recess, the knob being rotatable relative to the spindle and supported such that rotation of the knob in the first direction of fine adjuster rotation shifts the spindle and spool axially relative to the housing in a first direction of spool motion and moves the brake member actuation surface of the spool toward the first drag adjustment surface of the drag adjustment member to increase the force of the brake disc on the spool and increase the drag on the spool, and such that rotation of the knob in the second direction of fine adjuster rotation allows the first biasing member to shift the spindle and spool axially relative to the housing in a second direction of spool motion opposite to the first direction of spool motion to move the brake member actuation surface of the spool away from the first drag adjustment surface of the drag adjustment member so as to decrease the force of the brake disc on the spool and decrease the drag on the spool, and the fine drag adjuster comprising a second biasing member positioned in the recess between the knob and base of the recess operable to bias the knob away from the base of the recess.

17. A reel according to claim 16 wherein the second biasing member comprises a stack of plural belleville washers.

18. A fishing reel according to claim 1 wherein the drag adjustment member comprise a drag member comprising a drag body portion positioned within the interior of the housing and comprising a lever portion projecting outwardly from the interior of the housing, and wherein the cam member is positioned within the interior of the housing.

19. A fishing reel according to claim 1 wherein there is no cover that separates the brake member, braking surface, and brake disk from the rest of the interior of the housing.

20. A fishing reel according to claim 1 wherein the first spool receiving end portion of the housing has a first housing portion that surrounds at least a portion of the first end portion of the spool, wherein the first portion has a first outer diameter, wherein the second spool receiving end portion of the housing has a second housing portion that at least partially surrounds the second end portion of the spool, wherein the second housing portion has a second outer diameter, and wherein the housing portion also surrounds the brake member, and wherein the first and second diameters are the same.

21. A fishing reel comprising:
a housing;
a spindle coupled to the housing;
a fishing line spool comprising first and second spool end portions and a spool body portion, the spool defining a spindle receiving opening extending axially through the spool, the spool being rotatably coupled to the spindle with the spindle positioned in the spindle receiving opening such that the spool is rotatable relative to the spindle;
a brake member rotatably supported by the spindle for rotation relative to the spindle, the brake member comprising a braking surface positioned to face one of the first and second spool end portions, said one of the first and second spool end portions comprising a brake member actuation surface opposed to the braking surface, at least one brake disc positioned at least partially between the braking surface and the brake actuation surface;
a drag adjustment member rotatably coupled to the spindle and axially movable relative to the spindle axis, the drag adjustment member also being rotatable relative to the brake member, the drag adjustment member comprising opposed first and second drag adjustment surfaces, the first drag adjustment surface facing the brake member actuation surface;
a cam member coupled to the housing in a fixed position relative to the housing, the cam member comprising a first cam member surface facing the second drag adjustment surface, one of the first cam member surface and the second drag member surface comprising a cam coupled thereto and the other of the first cam member surface and second drag member comprising at least one cam engager positioned to engage the cam, the cam being configured such that rotation of the drag adjustment member about the spindle and relative to the cam member in a first direction of rotation results in the cam and cam engager moving the drag adjustment member axially toward the spool and rotation of the drag adjustment member about the spindle and relative to the cam member in a second direction of rotation opposite to said first direction or rotation results in the cam and cam engager moving the drag adjustment member axially away from the spool, and wherein the movement of the drag adjustment member toward the spool increases the force of the brake disc on the spool and increases the drag on the spool and movement of the drag adjustment member away from the spool reduces the force of the brake disc on the spool and decreases the drag on the spool;
a first biasing member positioned to bias the spool away from the brake member;
the drag adjustment member comprising a drag adjustment member position adjustment projection extending outwardly from the housing;
a fine drag adjuster rotatably coupled to the housing for rotation about the spindle axis, the fine drag adjuster being coupled to the spindle such that rotation of the fine drag adjuster in a first direction of fine adjuster rotation shifts the spindle and spool axially relative to the housing in a first direction of spool motion and moves the brake member actuation surface of the spool toward the first drag adjustment surface of the drag adjustment member to increase the force of the brake disc on the spool and increase the drag on the spool, and such that rotation of the fine drag adjuster in a second direction of fine adjuster rotation that is opposite to said first direction of fine adjuster rotation allows the first biasing member to shift the spindle and spool axially relative to the housing in a second direction of spool motion opposite to the first direction of spool motion to move the brake member actuation surface of the spool away from the first drag adjustment surface of the drag adjustment member so as to decrease the force of the brake disc on the spool and decrease the drag on the spool; and
a handle rotatably coupled to the housing and drivenly coupled to the spool by the drag applied to the spool by the cam member, drag adjustment member and brake such that rotation of the handle in one direction of handle rotation rotates the spool in one spool rotation direction about the spindle to take up fishing line onto the spool; and
further comprising a handle anti-rotation assembly coupled to the handle and operable to restrict the rotation of the handle in a direction opposite to said one direction of handle rotation, the anti-rotation assembly comprising a dog wheel comprising a periphery that comprises dog teeth spaced about the periphery of the dog wheel, the dog wheel being supported within the housing so as to rotate relative to the spindle, a plurality of spaced apart dog elements coupled to the housing and configured to engage the dog teeth, the dog elements and dog teeth being shaped to allow rotation of the handle in the one direction of handle rotation and to restrict the rotation of the handle in a direction of handle rotation opposite to said one direction of handle rotation.

22. A fishing reel according to claim 21 wherein the dog wheel is sized such that the entire periphery of at least a portion of the dog wheel is spaced closer to the exterior of the housing than to the spindle.

23. A fishing reel according to claim 21 wherein the dog elements each comprise a flexure element comprising first and second leg portions coupled together at a proximate end portion and spaced apart at a distal end portion, the distal end portion of the first leg portion being coupled to the housing, the flexure members being oriented such that the distal end portion of the second leg portion repetitively engages and disengages the teeth as the handle is rotated in said one direction of handle rotation, the flexure member biasing the distal end portion of the second leg portion into engagement with the teeth.

24. A fishing reel comprising:
a housing;
a spindle coupled to the housing;
a fishing line spool comprising first and second spool end portions and a spool body portion, the spool defining a spindle receiving opening extending axially through the spool, the spool being rotatably coupled to the spindle with the spindle positioned in the spindle receiving opening such that the spool is rotatable relative to the spindle;
a brake member rotatably supported by the spindle for rotation relative to the spindle, the brake member comprising a braking surface positioned to face one of the first and second spool end portions, said one of the first and second spool end portions comprising a brake member actuation surface opposed to the braking surface, at least one brake disc positioned at least partially between the braking surface and the brake actuation surface;
a drag adjustment member rotatably coupled to the spindle and axially movable relative to the spindle axis, the drag adjustment member also being rotatable relative to the brake member, the drag adjustment member comprising opposed first and second drag adjustment surfaces, the first drag adjustment surface facing the brake member actuation surface;
a cam member coupled to the housing in a fixed position relative to the housing, the cam member comprising a first cam member surface facing the second drag adjustment surface, one of the first cam member surface and the second drag member surface comprising a cam coupled thereto and the other of the first cam member surface and second drag member surface comprising at least one cam engager positioned to engage the cam, the cam being configured such that rotation of the drag adjustment member about the spindle and relative to the cam member in a first direction of rotation results in the cam and cam engager moving the drag adjustment member axially toward the spool and rotation of the drag adjustment member about the spindle and relative to the cam member in a second direction of rotation opposite to said first direction or rotation results in the cam and cam engager moving the drag adjustment member axially away from the spool, and wherein the movement of the drag adjustment member toward the spool increases the force of the brake disc on the spool and increases the drag on the spool and movement of the drag adjustment member away from the spool reduces the force of the brake disc on the spool and decreases the drag on the spool;
a first biasing member positioned to bias the spool away from the brake member;
the drag adjustment member comprising a drag adjustment member position adjustment projection extending outwardly from the housing;
a fine drag adjuster rotatably coupled to the housing for rotation about the spindle axis, the fine drag adjuster being coupled to the spindle such that rotation of the fine drag adjuster in a first direction of fine adjuster rotation shifts the spindle and spool axially relative to the housing in a first direction of spool motion and moves the brake member actuation surface of the spool toward the first drag adjustment surface of the drag adjustment member to increase the force of the brake disc on the spool and increase the drag on the spool, and such that rotation of the fine drag adjuster in a second direction of fine adjuster rotation that is opposite to said first direction of fine adjuster rotation allows the first biasing member to shift the spindle and spool axially relative to the housing in a second direction of spool motion opposite to the first direction of spool motion to move the brake member actuation surface of the spool away from the first drag adjustment surface of the drag adjustment member so as to decrease the force of the brake disc on the spool and decrease the drag on the spool; and
a handle rotatably coupled to the housing and drivenly coupled to the spool by the drag applied to the spool by the cam member, drag adjustment member and brake such that rotation of the handle in one direction of handle rotation rotates the spool in one spool rotation direction about the spindle to take up fishing line onto the spool; and
comprising a planetary gear drive assembly operatively driven by rotation of the handle in said one direction of handle rotation and coupled to the spool by the drag on the spool from the drag adjustment member, cam member and brake member to rotate the spool in said one spool rotation direction; and
wherein the planetary gear drive assembly comprises a drive gear rotated about a drive gear axis in response to rotation of the handle in said one direction of handle rotation, a planet carrier gear supported by the spindle for rotation about a second axis offset from the drive gear axis, the planet carrier gear being driven in rotation in response to rotation of the drive gear, a planet gear carrier rotated about the second axis in response to rotation of the planet carrier gear, a plurality of planet gears pivotally carried by the planet gear carrier, a ring gear coupled to the housing and engaged by the planet carrier gears, a sun gear coupled to the spool by the drag on the spool from the drag adjustment member, cam member and brake member to rotate the spool in said one spool rotation direction upon driving the sun gear, the planet gears driving the sun gear to rotate the spool via the drag on the spool upon rotation of the drive gear; and
wherein the second axis about which the planet gear carrier is rotatable is coaxial with the spindle axis.

25. A fishing reel according to claim 24 wherein the ring gear is fixed to the housing.

26. A fishing reel according to claim 24 wherein there are four planet gears spaced equally apart on the planet gear carrier.

27. A fishing reel comprising:
a housing;
a spindle coupled to the housing, the spindle having a longitudinal axis;
a fishing line spool comprising first and second spool end portions and a spool body portion, the spool defining a spindle receiving opening extending axially through the spool, the spool being rotatably coupled to the spindle with the spindle positioned in the spindle receiving opening such that the spool is rotatable relative to the spindle;

a brake member rotatably supported by the spindle for rotation relative to the spindle, the brake member comprising a braking surface positioned to face one of the first and second spool end portions, said one of the first and second spool end portions comprising a brake member actuation surface opposed to the braking surface, at least one brake disc positioned at least partially between the braking surface and the brake actuation surface;

a drag adjustment member rotatably coupled to the spindle and axially movable relative to the spindle axis, the drag adjustment member also being rotatable relative to the brake member, the drag adjustment member comprising opposed first and second drag adjustment surfaces, the first drag adjustment surface facing the brake member actuation surface;

a cam member coupled to the housing in a fixed position relative to the housing, the cam member comprising a first cam member surface facing the second drag adjustment surface, one of the first cam member surface and the second drag member surface comprising a cam coupled thereto and the other of the first cam member surface and second drag member comprising at least one cam engager positioned to engage the cam, the cam being configured such that rotation of the drag adjustment member about the spindle and relative to the cam member in a first direction of rotation results in the cam and cam engager moving the drag adjustment member axially toward the spool and rotation of the drag adjustment member about the spindle and relative to the cam member in a second direction of rotation opposite to said first direction or rotation results in the cam and cam engager moving the drag adjustment member axially away from the spool, and wherein the movement of the drag adjustment member toward the spool increases the force of the brake disc on the spool and increases the drag on the spool and movement of the drag adjustment member away from the spool reduces the force of the brake disc on the spool and decreases the drag on the spool;

a first biasing member positioned to bias the spool away from the brake member;

the drag adjustment member comprising a drag adjustment member position adjustment projection extending outwardly from the housing;

wherein the cam comprises at least one cam element projecting outwardly from said one of the first cam member surface and the second drag member surface toward the other of the first cam member surface and second drag member surface, the cam element comprising a plurality of cam segments that each project outwardly a different distance, a first cam segment projecting outwardly a first distance, a second cam segment projecting outwardly a second distance and a third cam segment projecting outwardly a third distance, wherein the first distance is less than the second distance, and wherein the second distance is less than the third distance;

wherein the at least one cam engager comprises a projection having a distal end portion configured to abut the cam segments, wherein rotation of the drag adjustment member in the first direction of rotation moves the distal end portion in a direction from the first toward the third cam segments to increase the drag, and wherein rotation of the drag adjustment member in the second direction of rotation moves the distal end portion in a direction from the third toward the first of the cam segments to thereby decrease the drag, wherein engagement of the distal end portion with the first cam segment results in a first drag setting corresponding to a first drag on the spool, wherein engagement of the distal end portion with the second cam segment results a second drag setting corresponding to a second drag on the spool that is greater than the first drag on the spool, and wherein engagement of the distal end portion with the third cam segment results in a third drag setting corresponding to a third drag on the spool that is greater than the second drag on the spool; and wherein each of the cam segments comprises a recess configured to receive the distal end portion of the cam engager upon moving the distal end portion into a position in alignment with the recess to thereby positively engage the distal end portion with the segment while permitting movement of the distal end portion out of the recess upon rotation of the drag adjustment member.

28. A fishing reel according to claim 27 comprising a plurality of said cam elements and a plurality of cam engagers, each cam engager being associated with and positioned to engage a respective associated one of the cam elements.

29. A fishing reel comprising:
a housing;
a spindle supported by the housing;
a spool carried by the spindle and rotatable relative to the spindle;
a handle drivenly coupled to a support, the support being rotatable relative to the spindle, a drag assembly coupling the support to the spool so as to rotate the spool in a first direction upon rotation of the handle in one direction of handle rotation provided that the drag force applied to the spool by the drag assembly exceeds forces on the spool resisting the drag force; and
a handle anti-rotation assembly operable to restrict the rotation of the handle in a direction opposite to said one direction of handle rotation, the anti-rotation assembly comprising a dog wheel carried by and rotated with the rotation of the support, the dog wheel comprising a periphery that comprises dog teeth spaced about the periphery of the dog wheel, a plurality of spaced apart dog elements coupled to the housing and configured to engage the dog teeth, the dog elements and dog teeth being shaped to allow rotation of the handle in the one direction of handle rotation and to restrict the rotation of the handle in a direction of handle rotation opposite to said one direction of handle rotation; and wherein the dog elements each comprise a flexure element comprising first and second leg portions coupled together at a proximate end portion and spaced apart at a distal end portion, the distal end portion of the first leg portion being coupled to the housing, the flexure members being oriented such that the distal end portion of the second leg portion repetitively engages and disengages the teeth as the handle is rotated in said one direction of handle rotation, the flexure member biasing the distal end portion of the second leg portion into engagement with the teeth.

30. A fishing reel according to claim 29 wherein the dog wheel is sized such that the periphery of at least a portion of the dog wheel is spaced closer to the exterior of the housing than to the spindle.

31. A fishing reel comprising:
a housing;

a spindle supported by the housing and comprising a spindle axis;

a spool carried by the spindle, the spool comprising first and second end portions, the spool being rotatable about the spindle axis and the first end portion of the spool comprising a brake actuation surface;

a brake member supported for axial movement along the spindle toward and away from the first end portion of the spool;

a lever actuated drag assembly operable to shift the brake member axially in a first direction along the spindle toward the brake actuation surface at the first end portion of the spool to increase the drag force on the spool, the lever actuated drag assembly also being operable to shift the brake member axially in a second direction opposite to the first direction away from the brake actuation surface at the firs end portion of the spool to decrease the drag force on the spool;

a handle rotatable at least in a first direction of handle rotation; and a planetary gear drive assembly operatively driven by rotation of the handle in said one direction of handle rotation and coupled to the brake actuation surface at the first end portion of the spool by the drag on the spool from the drag assembly and brake member to rotate the spool in said one spool rotation direction; and wherein the planetary gear drive assembly comprise a plurality of planetary gears pivotally supported by a planet gear carrier and wherein the planet gear carrier is rotatable about the spindle axis.

32. A fishing reel according to claim 31 wherein the planetary gear drive assembly comprises a drive gear rotated about a drive gear axis in response to rotation of the handle in said one direction of handle rotation, a planet carrier gear supported by the spindle for rotation about a second axis offset from the drive gear axis, the second axis being coaxial with the spindle axis, the planet carrier gear being driven in rotation in response to rotation of the drive gear, a planet gear carrier rotated about the second axis in response to rotation of the planet carrier gear, a plurality of planet gears pivotally carried by the planet gear carrier, a ring gear coupled to the housing and engaged by the planet carrier gears, a sun gear coupled to the spool by the drag on the spool from the drag adjustment member, cam member and brake member to rotate the spool in said one spool rotation direction upon driving the sun gear, the planet gears driving the sun gear to rotate the spool via the drag on the spool upon rotation of the drive gear.

33. A fishing reel according to claim 31 wherein the brake member is coaxial with the spindle axis and thereby with the second axis and the axis of rotation of the planet gear carrier.

* * * * *